US008611663B2

(12) United States Patent
Ihara

(10) Patent No.: US 8,611,663 B2
(45) Date of Patent: Dec. 17, 2013

(54) COMPUTER-READABLE MEDIUM STORING AN INFORMATION IMAGE AND APPARATUS AND COMPUTER-READABLE MEDIUM FOR GENERATING AND DETECTING AN INFORMATION IMAGE WITH FIVE PIXEL SERIES

(75) Inventor: Fujio Ihara, Kanagawa (JP)

(73) Assignee: FUJI Xerox Co., Ltd., Tokyo (JP)

( * ) Notice: Subject to any disclaimer, the term of this patent is extended or adjusted under 35 U.S.C. 154(b) by 387 days.

(21) Appl. No.: 12/959,957

(22) Filed: Dec. 3, 2010

(65) Prior Publication Data

US 2011/0274312 A1 Nov. 10, 2011

(30) Foreign Application Priority Data

May 10, 2010 (JP) ................................. 2010-108356

(51) Int. Cl.
*G06K 9/00* (2006.01)

(52) U.S. Cl.
USPC .. 382/181; 382/276; 235/462.09; 235/462.11

(58) Field of Classification Search
None
See application file for complete search history.

(56) References Cited

U.S. PATENT DOCUMENTS

| 5,866,895 A | 2/1999 | Fukuda et al. |
| 2004/0020989 A1* | 2/2004 | Muramatsu ................ 235/462.1 |
| 2007/0187512 A1* | 8/2007 | Yada ........................ 235/462.11 |

FOREIGN PATENT DOCUMENTS

| EP | 0672994 A1 | 9/1995 |
| JP | 7-254037 A | 10/1995 |
| JP | 8-171620 A | 7/1996 |
| JP | 2006-085679 A | 3/2006 |

* cited by examiner

*Primary Examiner* — Barry Drennan
*Assistant Examiner* — Andrew Moyer
(74) *Attorney, Agent, or Firm* — Sughrue Mion, PLLC

(57) ABSTRACT

An information image includes a first, second, third, fourth and fifth pixel series which represent first, second, third, fourth and fifth information, respectively. The first and second information are successions of binary numbers 0 or 1. The first and third pixel series are series of pixel lumps arranged continuously as rows in a rectangle. The second and fourth pixel series are series of pixel lumps arranged continuously as columns in the rectangle. The row of the third pixel series is at a predetermined position with respect to that of the first pixel series. The column of the fourth pixel series is at a predetermined position with respect to that of the second pixel series. The fifth pixel series is a series of pixel lumps arranged in an area other than the rows and the columns of the first, second, third and fourth pixel series are arranged.

8 Claims, 14 Drawing Sheets

FIG. 4

```
S400    DMIN=0
S402    FOR(X=2^(N-1);X<2^N-1;X++){// SINCE MSB IS ALSO A BIT OF AN ALL "1" SIGNAL, MSB IS EQUAL TO "1."
S404    FOR(Y=2^(N-1);Y<2^N-1;Y++){
S406    RX = (REVERSE OF X)//SCAN THE BITS OF X FROM LSB TO MSB.
S408    RY = (REVERSE OF Y)
S410    CALCULATE D(X, Y).//D(X, Y) IS A HUFFMAN DISTANCE BETWEEN X AND Y.
S412    CALCULATE D(X, RX).
S414    CALCULATE D(X, RY).
S416    CALCULATE D(X, ALL "1").
S418    CALCULATE D(Y, RX).
S420    CALCULATE D(Y, RY).
S422    CALCULATE D(Y, ALL "1").
S424    //CALCULATE A MINIMUM VALUE D AMONG THE SEVEN HUFFMAN DISTANCES.
S426    IF(D>DMIN){
S428    DMIN=D
S430    STORE CURRENT X AND Y.
S432    }
S434    }
S436    }
```

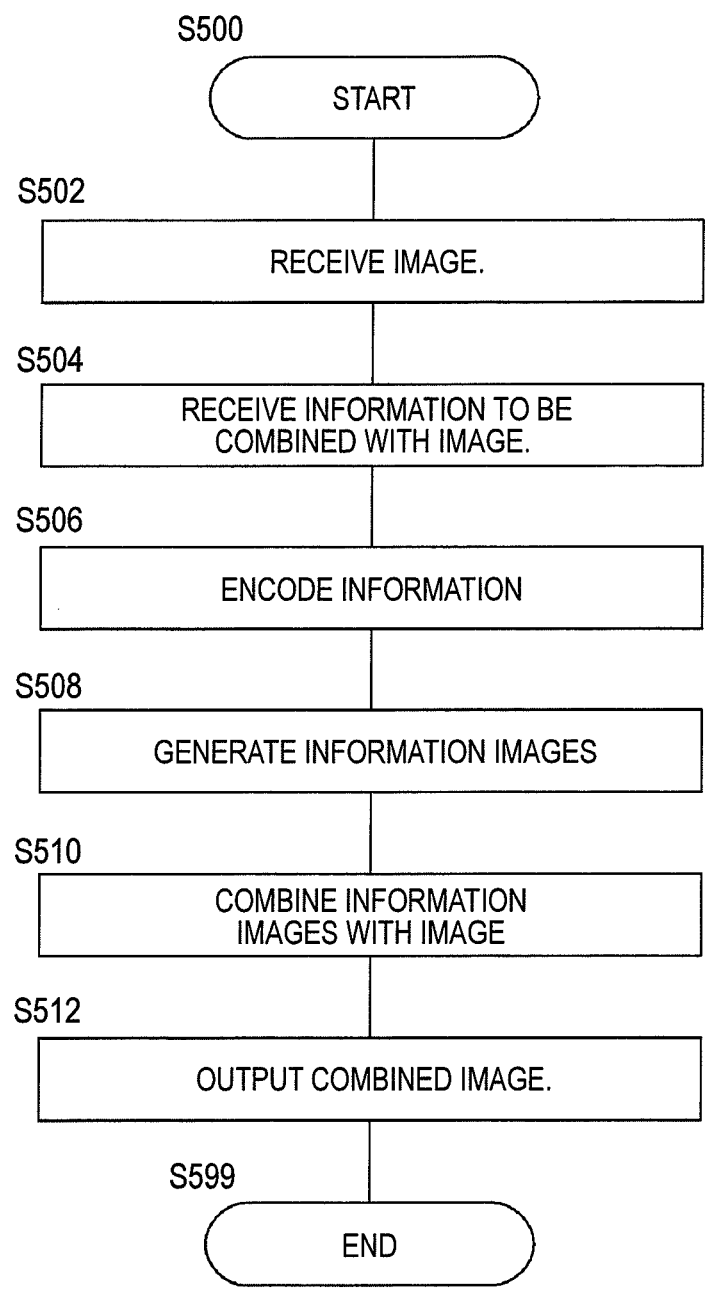

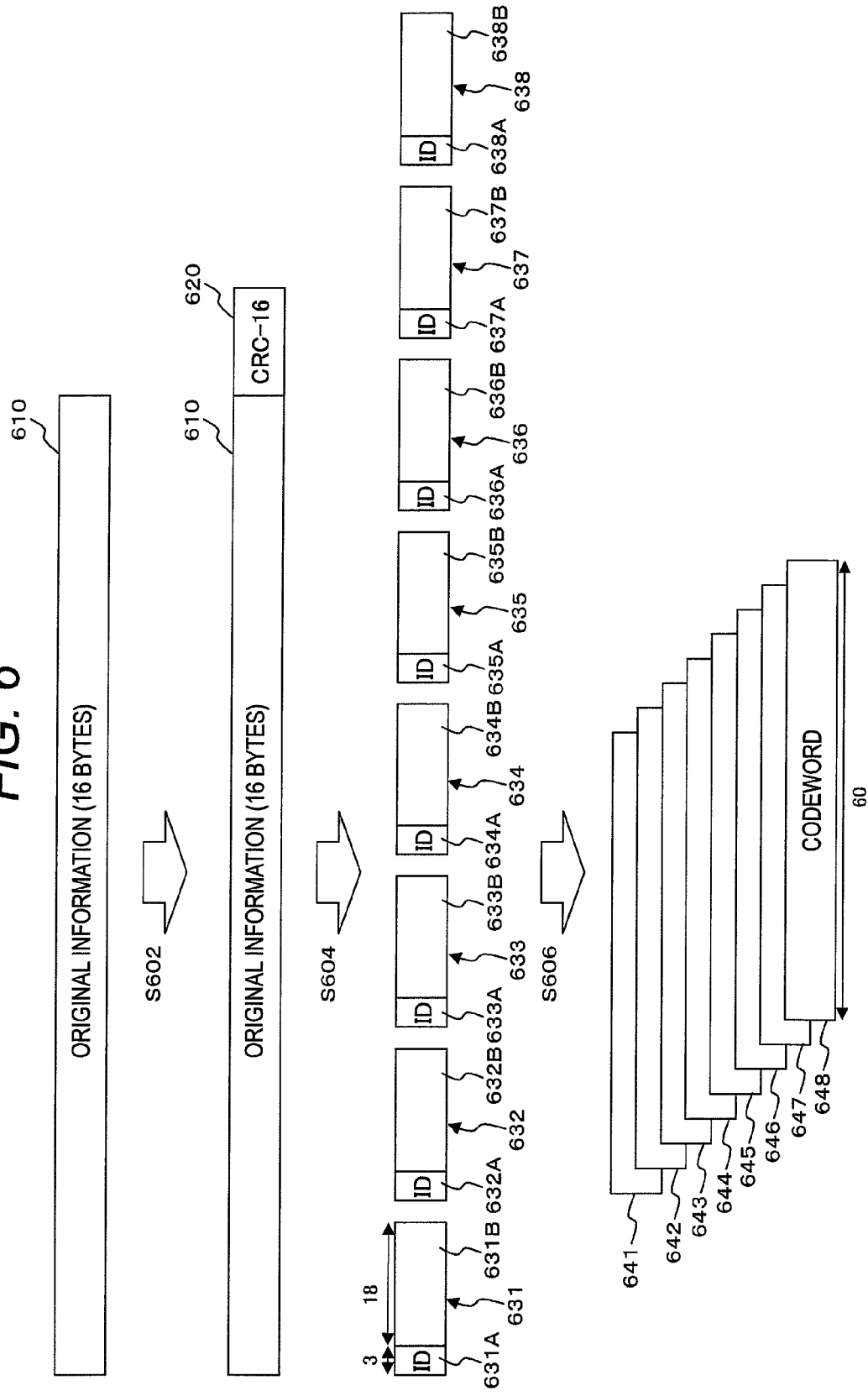

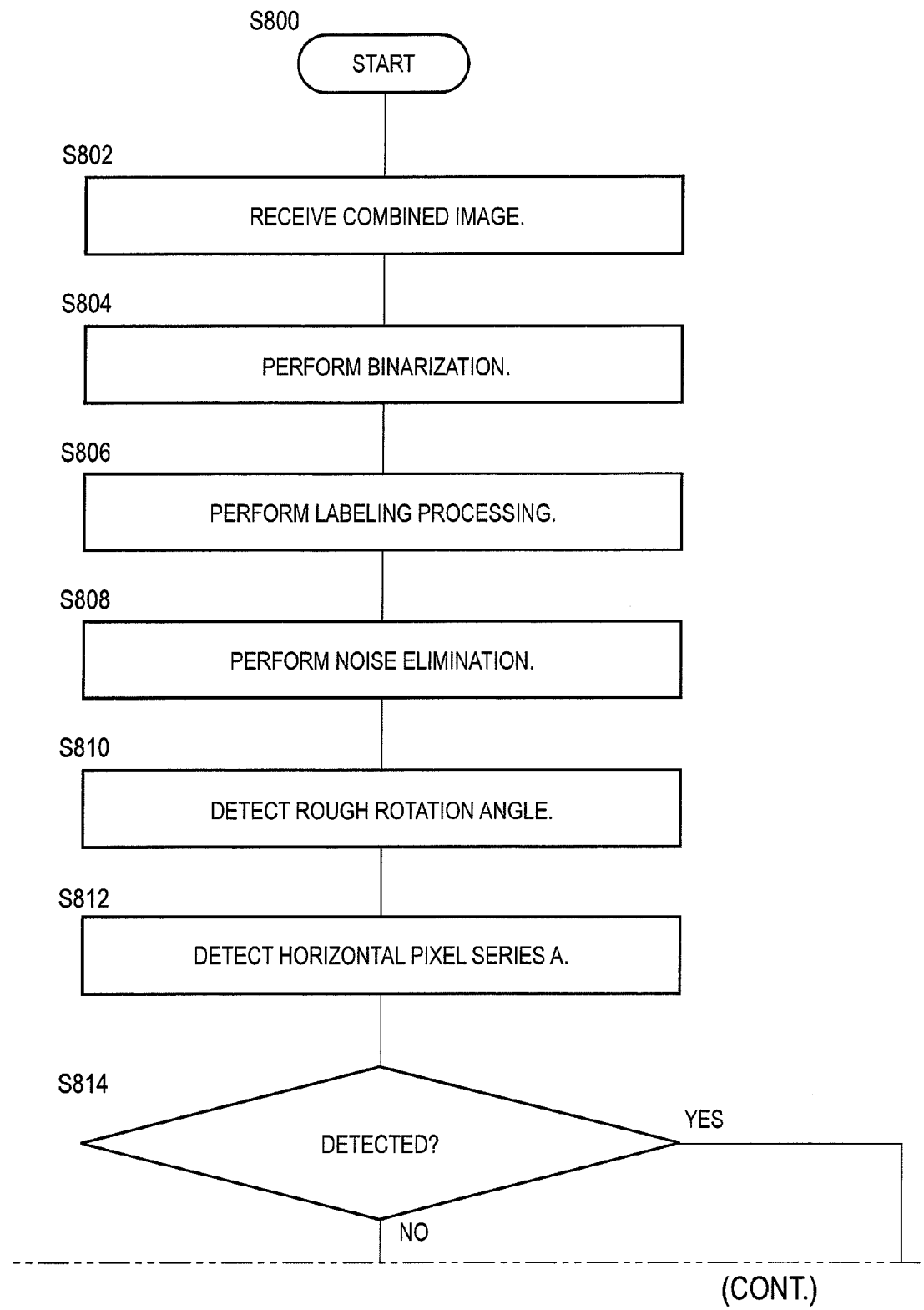

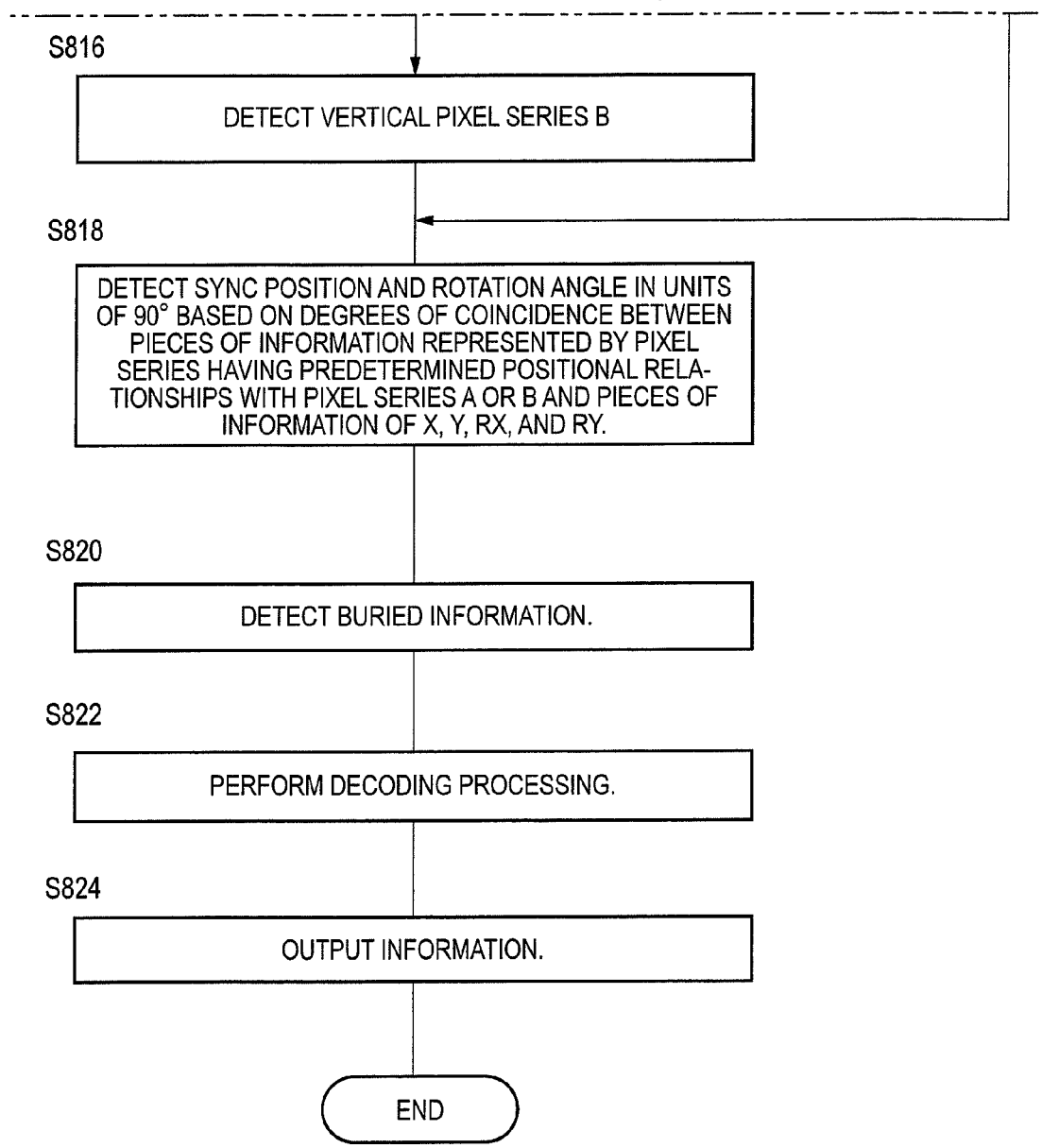

1111111111111111111111111111111111
0011110101100101100011110101100101

101100011110101100

001111010110010110

COMPUTER-READABLE MEDIUM STORING AN INFORMATION IMAGE AND APPARATUS AND COMPUTER-READABLE MEDIUM FOR GENERATING AND DETECTING AN INFORMATION IMAGE WITH FIVE PIXEL SERIES

CROSS-REFERENCE TO RELATED APPLICATION

This application is based on and claims priority under 35 USC119 from Japanese Patent Application No. 2010-108356 filed on May 10, 2010.

BACKGROUND

Technical Field

The present invention relates to an information image, an image processing apparatus and a computer-readable medium.

SUMMARY

According to an aspect of the invention, an information image which has a rectangle shape includes a first, second, third, fourth and fifth pixel series. The first pixel series represents first information as a succession of binary numbers 0 or 1 and is a series of pixel lumps arranged continuously as a row in the rectangle. The second pixel series represents second information as a succession of binary numbers 0 or 1 and is a series of pixel lumps arranged continuously as a column in the rectangle. The third pixel series represents third information and is a series of pixel lumps arranged continuously as a row which is located at a predetermined position with respect to the row of the first pixel series in the rectangle. The fourth pixel series represents fourth information and is a series of pixel lumps arranged continuously as a column which is located at a predetermined position with respect to the column of the second pixel series in the rectangle. The fifth pixel series represents fifth information buried in the information image and is a series of pixel lumps arranged in an area other than the rows and the columns of the first, second, third, and fourth pixel series in the rectangle are arranged in the information image. The third information and the fourth information are determined based on (i) a distance between the third information and the fourth information in an information space, (ii) a distance between the third information and reversed information of the third information in the information space, (iii) a distance between the third information and reversed information of the fourth information in the information space, (iv) a distance between the third information and information which is a succession of binary numbers 0 or 1 in the information space, (v) a distance between the fourth information and reversed information of the fourth information in the information space, (vi) a distance between the fourth information and reversed information of the third information in the information space, and (vii) a distance between the fourth information and information which is a succession of binary numbers 0 or 1 in the information space.

BRIEF DESCRIPTION OF THE DRAWINGS

Exemplary embodiments of the invention will be described in detail based on the following figures, wherein:

FIG. 4 shows an example algorithm for generating a signal series X and a signal series Y;

FIG. 5 is a flowchart of an example process which is executed by the image processing apparatus for combining information images with an image;

FIG. 6 illustrates an example process for generating code words;

FIG. 8 is a flowchart of an example process which is executed by the image processing apparatus for detecting information images;

DETAILED DESCRIPTION

First, the information image will be described.

The information image is an image code generated systematically to express electronic data in a machine-readable manner and is called a two-dimensional code.

The information image has a rectangular shape (hereinafter referred to as a block). More specifically, the information image may have either a square shape whose vertical and horizontal lengths are the same or a rectangular shape whose vertical and horizontal lengths are different from each other. The following description will mainly be directed to a case that an information image has a square shape.

Pixel lumps are drawn in the information image. A state that a pixel lump is drawn at the position where it can be drawn and a state that a pixel lump is not drawn at the position where it can be drawn are each represented by a binary number "0" or "1." Positions where a pixel lump can be drawn are predetermined lattice intersecting points in the rectangle, and adjoining lattice intersecting points are spaced from each other by a predetermined distance.

The term "pixel lump" means a pixel region of one or more pixels (pixel lumps are arranged in units of four or eight). The pixel lump should have a color that is different from a background color of an image to be combined with the information image and may be a black pixel lump, a color (e.g., yellow) pixel lump, a white pixel lump (in the case where the background color of an image to be combined with the information image is black or the like), or the like. The following description will mainly be directed to a case that the pixel lump is a black pixel lump. The pixel lump is also called a dot.

A preferred embodiment of the present invention will be hereinafter described with reference to the drawings.

Figure 1:
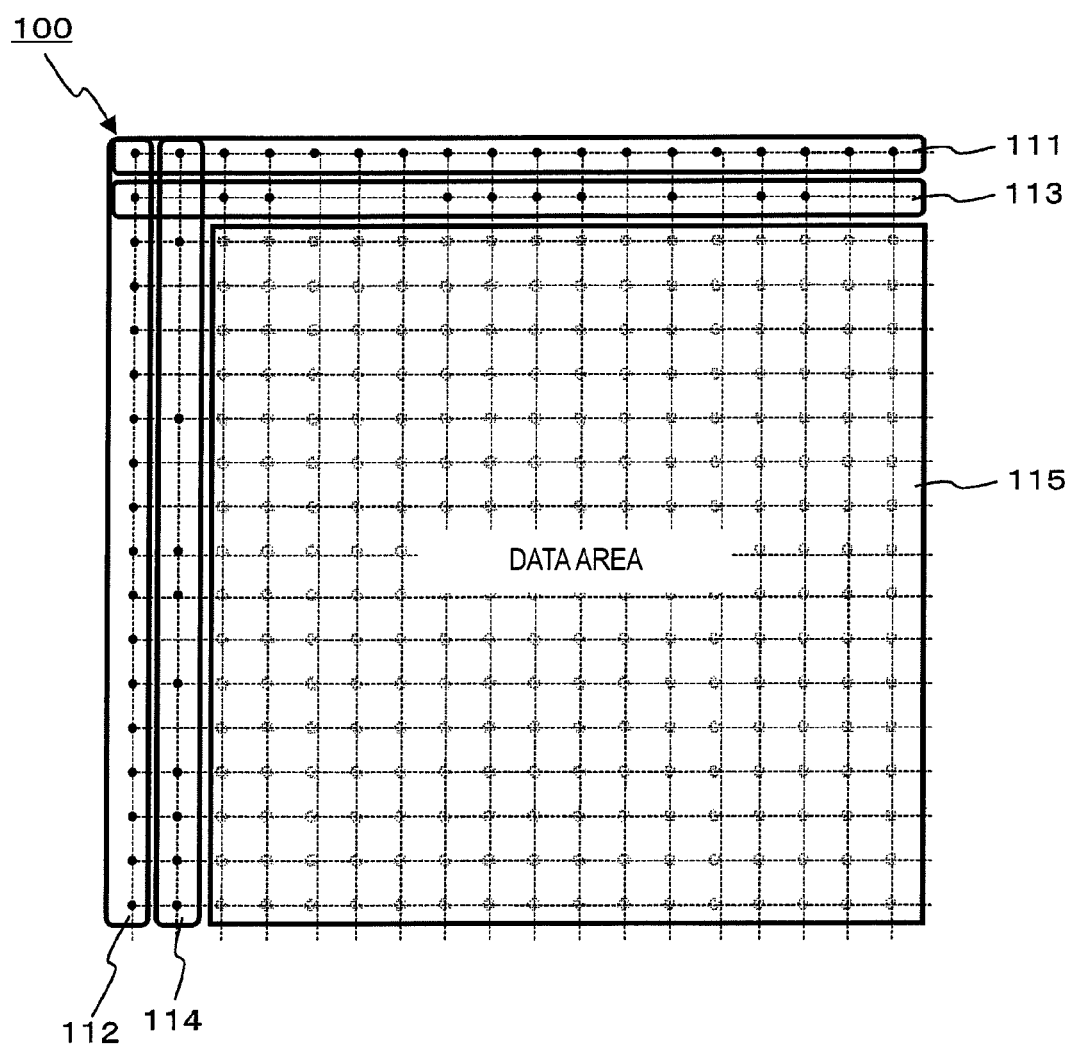
FIG. 1 illustrates example positional relationships between pixel series in an information image according to an embodiment.

FIG. 1 illustrates example positional relationships between pixel series in an information image according to the embodiment.

The term "module" means a software (computer program) component, a hardware component, or the like that is generally considered logically separable. Therefore, the term "module" as used in the embodiment means not only a module of a computer program but also a module of a hardware configuration. As such, the embodiment is a description of a computer program for causing modules to function (i.e., a program for causing a computer to execute individual steps, a program for causing a computer to function as individual means, a program for causing a computer to realize individual functions), a system, and a method. For convenience of description, the term "to store" and terms equivalent to it will be used. Where the embodiment is intended to be a computer program, these terms mean storing information in a storage device or performing a control so that information is stored in a storage device. Modules may correspond to functions one to one. In implementations, one module may be formed by one program. And plural modules may be formed by one program and vice versa. Plural modules may be executed by one computer, and one module may be executed by plural computers in a distributed or parallel environment. One module may include another module. In the following description, the term "connection" is used for referring to not only physical connection but also logical connection (e.g., data exchange, commanding, and a referencing relationship between data). The term "predetermined" means that the item modified by this term was determined before a time point of processing concerned (i.e., before a start of processing of the embodiment), and also means that the item modified by this term is determined before a time point of processing concerned according to a current or past situation or state even in the case where the item modified by this term is determined after a start of processing of the embodiment.

The term "system or apparatus" includes not only a configuration in which plural computers, pieces of hardware, devices, etc. are connected to each other by a communication means such as a network (including a one-to-one communication connection) but also what is implemented by a single (piece of) computer, hardware, device, or the like. The terms "apparatus" and "system" are used so as to be synonymous with each other. Naturally, the term "system" does not include just a social "mechanism" (social system) which is a man-made rule.

Subject information is read from a storage device every time processing is performed by each module or every time each piece of processing is performed in the case where plural pieces of processing are performed in a module. And a processing result is written to the storage device after execution of such (a piece of) processing. Therefore, reading from the storage device before processing or writing to the storage device after processing may not be described. The storage device may be an HDD, a RAM (random access memory), an external storage medium, a storage device that is connected via a communication line, a register provided in a CPU (central processing unit), or the like.

An example information image 100 shown in FIG. 1 is a square in which a 18×18 pixel lumps can be drawn, and has a pixel series A 111, a pixel series B 112, a pixel series X 113, a pixel series Y 114, and a data area 115.

The pixel series A 111 is a series in which pixel lumps are arranged continuously in a row of the information image 100 and which represents first information which is a succession of binary numbers "0" or "1."

If a state that a black pixel lump is drawn is represented by the binary number "1," the first information is information all of whose pixel lumps are "1." If a state that a black pixel lump is drawn is represented by the binary number "0," the first information is information all of whose pixel lumps are "0." In either case, the pixel series A 111 is a series in which black pixel lumps (in the example of FIG. 1, 18 black pixel lumps) are arranged continuously. The following description will mainly be made in such a manner that the first information is information all of whose pixel lumps are "1" (i.e., a state that a black pixel lump is drawn is represented by the binary number "1").

The manner of expression (binary number "0" or "1") of the state that a black pixel lamp is drawn is kept the same in at least plural information images to be combined with a document.

The pixel series B 112 is a series in which pixel lumps are arranged continuously in a column of the information image 100 and which represents second information which is a succession of binary numbers "0" or "1."

If a state that a black pixel lump is drawn is represented by the binary number "1," the second information is information all of whose pixel lumps are "1." If a state that a black pixel lump is drawn is represented by the binary number "0," the second information is information all of whose pixel lumps are "0." In either case, the pixel series B 112 is a series in which black pixel lumps (in the example of FIG. 1, 18 black pixel lumps) are arranged continuously. The following description will mainly be made in such a manner that the second information is information all of whose pixel lumps are "1."

Where the information image 100 is a square, the first information and the second information are the same.

The pixel series A 111 may be located at any position as long as it is a row (a series of pixel lumps arranged in the horizontal direction) in the information image 100, and the pixel series B 112 may be located at any position as long as it is a column (a series of pixel lumps arranged in the vertical direction) in the information image 100. It is preferable that the pixel series A 111 be the top row, the bottom row, the row right under the top row, or the row right over the bottom row in the information image 100. It is preferable that the pixel series B 112 be the leftmost column, the rightmost column, the column immediately on the right of the leftmost column, or the column immediately on the left of the rightmost column in the information image 100. The following description will mainly be made in such a manner that the pixel series A 111 is the top row (first row) in a rectangle and the pixel series B 112 is the leftmost column (first column) in the rectangle.

The pixel series X 113 is a row located at a predetermined position with respect to the pixel series A 111 in the information image 100, and is a series in which pixel lumps representing third information are arranged.

The pixel series Y 114 is a column located at a predetermined position with respect to the pixel series B 112 in the information image 100, and is a series in which pixel lumps representing fourth information are arranged.

The pixel series X 113 may be located at any position as long as it is a row (a series of pixel lumps arranged in the horizontal direction) in the information image 100, and the pixel series Y 114 may be located at any position as long as it is a column (a series of pixel lumps arranged in the vertical direction) in the information image 100. It is preferable that the pixel series X 113 be the top row, the bottom row, the row right under the top row, or the row right over the bottom row in the information image 100. That is, it is preferable that the pixel series X 113 be the bottom row, the row right under the top row, or the row right over the bottom row if the pixel series A 111 is the top row, be the top row, the bottom row, or the row right over the bottom row if the pixel series A 111 is the row right under the top row, be the top row, the row right under the top row, or the row right over the bottom row if the pixel series A 111 is the bottom row, and be the top row, the bottom row, or the row right under the top row if the pixel series A 111 is the row right over the bottom row. It is preferable that the pixel series Y 114 be the leftmost column, the rightmost column, the column immediately on the right of the leftmost column, or the column immediately on the left of the rightmost column. That is, it is preferable that the pixel series Y 114 be the rightmost column, the column immediately on the right of the leftmost column, or the column immediately on the left of the rightmost column if the pixel series B 112 is the leftmost column, be the leftmost column, the column immediately on the right of the leftmost column, or the column immediately on the left of the rightmost column if the pixel series B 112 is the rightmost column, be the leftmost column, the rightmost column, or the column immediately on the left of the rightmost column if the pixel series B 112 is the column immediately on the right of the leftmost column, and be the leftmost column, the rightmost column, or the column immediately on the right of the leftmost column if the pixel series B 112 is the column immediately on the left of the rightmost column.

The following description will mainly be made in such a manner that the pixel series X 113 is the row (second row) right under the top row in a rectangle and the pixel series Y 114 is the column (second column) immediately on the right of the leftmost column in the rectangle.

The third information and the fourth information are determined based on a distance between them in an information space, a distance between the third information and reversed information of the third information in the information space, a distance between the third information and reversed information of the fourth information in the information space, a distance between the third information and information that is a succession of binary numbers "0" or "1" in the information space, a distance between the fourth information and reversed information of the fourth information in the information space, a distance between the fourth information and reversed information of the third information in the information space, and a distance between the fourth information and information that is a succession of binary numbers "0" or "1" in the information space. The third information represents information to be used for detecting a rotation angle in units of 90° of an image and a sync position together with the first information. The fourth information represents information to be used for detecting a rotation angle in units of 90° of an image and a sync position together with the second information. The term "sync position" means a position to be used for identifying the unit of information images 100 in the case where the information images 100 (may be different from each other in fifth information) are arranged repeatedly in an image. For example, the sync position is a position where a first pixel series (pixel series A 111) and a second pixel series (pixel series B 112) intersect each other.

Where the "information that is a succession of binary numbers 0 or 1" is to be compared with the third information, it has the same length as the third information. Where "information that is a succession of binary numbers 0 or 1" is to be compared with the fourth information, it has the same length as the fourth information. Where the information image 100 is a square, the third information and the fourth information have the same length and the first information and the second information are the same. Therefore, the "information that is a succession of binary numbers 0 or 1" may be either the first information or the second information.

Where "information that is a succession of binary numbers 1" is to be compared with the third information, also "information that is a succession of binary numbers 1" is compared with the fourth information. Where "information that is a succession of binary numbers 0" is to be compared with the third information, also "information that is a succession of binary numbers 0" is compared with the fourth information.

The following description will mainly be made in such a manner that "information that is a succession of binary numbers 1" is used. "Information that is a succession of binary numbers 1" may be represented by All "1."

For example, the Huffman distance is employed as the distance in the information space.

The term "determined based on the (above-described) distances" means, for example, selecting a combination whose minimum distance among the seven distances is largest among minimum distances of all combinations.

The term "all combinations" means combinations of pieces of information each of which can be expressed by one column or row in the information image 100.

However, since the pixel series X 113 crosses the pixel series B112 and the pixel series B 112 is a series in which black pixel lumps are arranged continuously, a black pixel lump should be drawn at their intersecting point (in the example of FIG. 1, the second row, first column position). If a state that a black pixel lump is drawn is represented by "1," information corresponding to the pixel lump located at the intersecting point of the pixel series X 113 and the pixel series B 112 is "1."

Likewise, since the pixel series Y 114 crosses the pixel series A111 and the pixel series A 111 is a series in which black pixel lumps are arranged continuously, a black pixel lump should be drawn at their intersecting point (in the example of FIG. 1, the first row, second position). If a state that a black pixel lump is drawn is represented by "1," information corresponding to the pixel lump located at the intersecting point of the pixel series Y 114 and the pixel series A 111 is "1."

Since the pixel series X 113 crosses the pixel series Y 114, their pixel lumps at the intersecting point are in the same state (i.e., a black pixel lump is either drawn or not drawn).

The data area 115 is an area in the information image 100 other than the rows and columns of the pixel series A 111, the pixel series B 112, the pixel series X 113, and the pixel series Y 114, and has a series in which pixel lumps representing fifth information which is information buried in the information image 100 are arranged. In the example of FIG. 1, the data area 115 is a 16×16 area.

Figure 2:
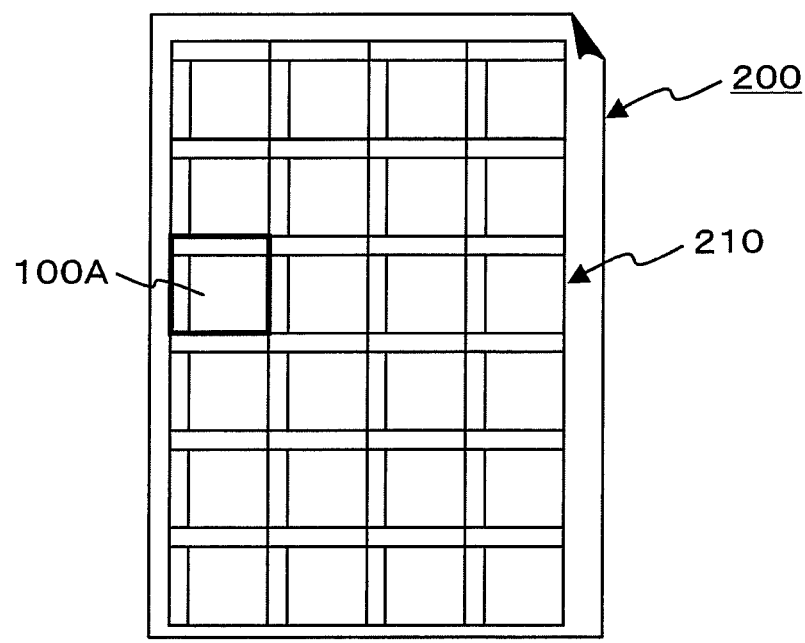
FIG. 2 is a conceptual diagram illustrating a combined image obtained by combining information images with an image.

FIG. 2 is a conceptual diagram illustrating a combined image obtained by combining information images with an image.

A document image 200 has a combining area 210 which has plural information images 100A. Information images 100 (100A) as exemplified in FIG. 1 are arranged continuously in the combining area 210. Since naturally the plural information images 100 in the combining area 210 have the same structure (i.e., at least in the combining area 210, the pixel series A 111, the pixel series B 112, the pixel series X 113, and the pixel series Y 114 are located at the same positions in the plural information images 100), successions of pixel series A 111, successions of pixel series B 112, successions of pixel series X 113, and successions of pixel series Y 114 exist in the combining area 210 in such a manner that each succession bridges plural information images 100. That is, series in each of which black pixel lumps are arranged continuously (i.e., successions of pixel series A 111 and successions of pixel series B 112) exist in the combining area 210 and they intersect each other; continuous black pixel lumps are arranged in matrix form. The pixel series X 113 and the pixel series Y 114 are arranged repeatedly.

When the document image 200 is printed and then read with a scanner or the like, a resulting image may be rotated. In that event, the successions of pixel series A 111 are not kept horizontal and the successions of pixel series B 112 are not kept vertical. It is necessary to restore the state before the rotation or detect the fifth information taking the rotation into consideration. This will be described later with reference to FIG. 7 and the following figures.

Figure 3:
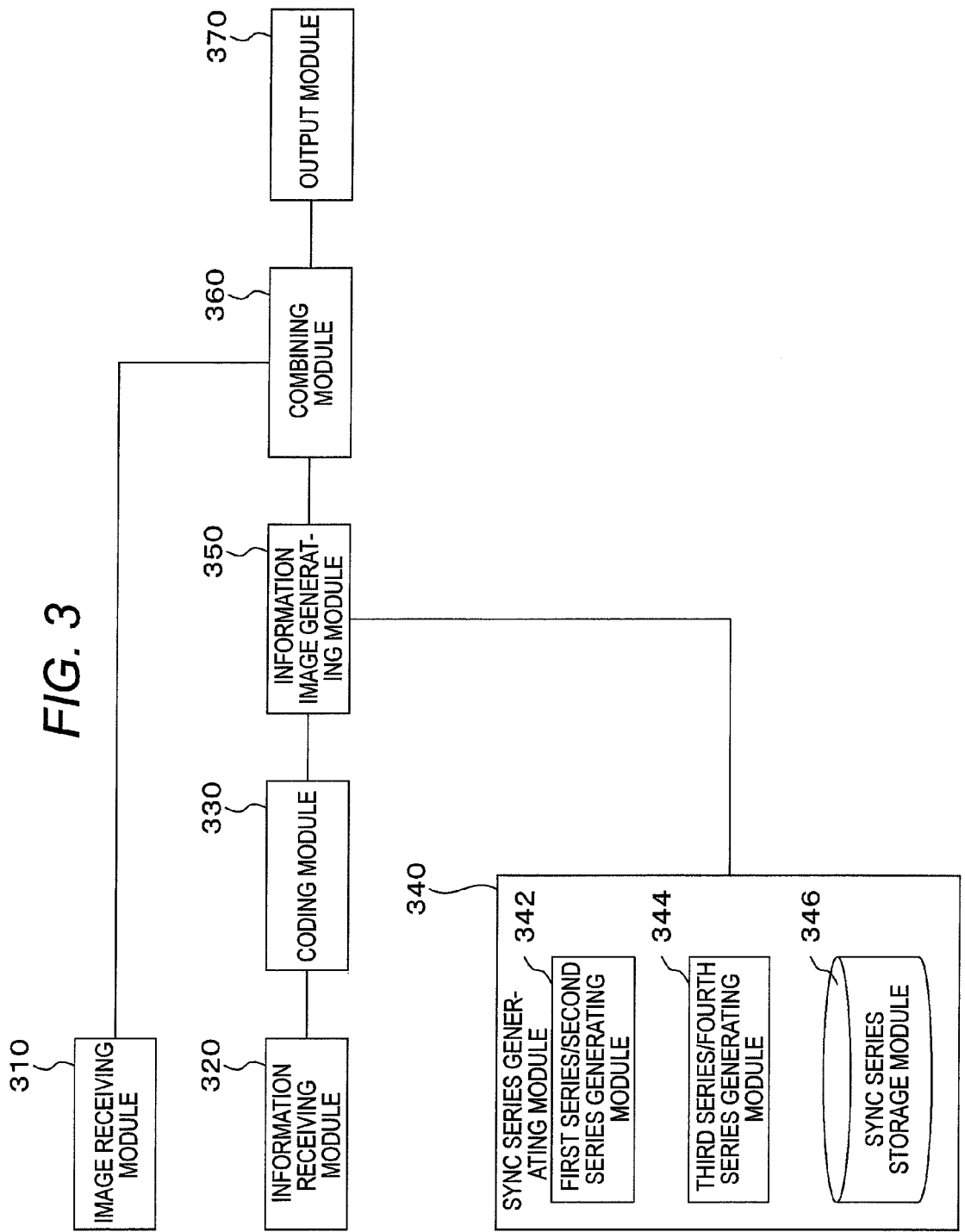
FIG. 3 is a conceptual diagram showing an example module configuration of an image processing apparatus according to the embodiment for combining information images with an image.

FIG. 3 is a conceptual diagram showing an example module configuration of an image processing apparatus according to the embodiment for combining information images with an image. As shown in FIG. 3, the image processing apparatus is composed of an image receiving module 310, an information receiving module 320, a coding module 330, a sync series generating module 340, an information image generating module 350, a combining module 360, and an output module 370.

The image receiving module 310, which is connected to the combining module 360, receives an image and passes the received image to the combining module 360. The term "to receive an image" includes reading an image with a scanner or the like, receiving an image from an external apparatus over a communication line by facsimile or the like, taking video with a CCD (charge-coupled device) or the like, reading an image from an HDD (one incorporated in a computer, one connected via a network, or the like) or the like, etc. An image to be received may be either a binary image or a multi-value image (including a color image). A single image or plural images may be received. An image to be received may be a business document, a brochure for advertisement, or the like.

The information receiving module 320, which is connected to the coding module 330, receives information to be added to the image received by the image receiving module 310 and passes the received information to the coding module 330. The term "to receive information" includes reading information from an HDD, receiving information that is input by an operator's manipulating a touch panel, a keyboard, or the like, calculating an image identification code for identification of an image, reading a printer identification code for identification of a printer for printing an image, reading an operator identification code for identification of an operation who gave an instruction to print an image from an IC card or the like owned by the operator, etc. Information to be received may be an image identification code, a printer identification code, an operator identification code, or the like.

The coding module 330, which is connected to the information receiving module 320 and the information image generating module 350, codes the information received by the information receiving module 320 and passes resulting coded information to the information image generating module 350. The details of processing performed by the coding module 330 will be described later with reference to FIG. 6.

The sync series generating module 340 is connected to the information image generating module 350. The sync series generating module 340 is composed of a first series/second series generating module 342, a third series/fourth series generating module 344, and a sync series storage module 346.

The first series/second series generating module 342 generates a pixel series A 111 and a pixel series B 112 in an information image 100 as shown in FIG. 1. That is, the first series/second series generating module 342 generates series that are successions of black pixel lumps and represent pieces of information in each of which binary numbers "0" or "1" are arranged continuously according to a predetermined row length and column length of the information image 100.

The third series/fourth series generating module 344 generates a pixel series X 113 and a pixel series Y 114 in the information image 100 as shown in FIG. 1. The details of processing of generating the pixel series X 113 and the pixel series Y 114 will be described later with reference to FIG. 4.

The sync series storage module 346 stores the pixel series A 111 and the pixel series B 112 generated by the first series/second series generating module 342 and the pixel series X 113 and the pixel series Y 114 generated by the third series/fourth series generating module 344. That is, the sync series storage module 346 stores an information image 100 in which the pixel series A 111, the pixel series B 112, the pixel series X 113, and the pixel series Y 114 as shown in FIG. 1 are determined. Information in the data area 115 is generated by the information image generating module 350.

The information image generating module 350, which is connected to the coding module 330, the sync series generating module 340, and the combining module 360, generates an information image 100 based on the pixel series A 111, the pixel series B 112, the pixel series X 113, and the pixel series Y 114 generated by the sync series generating module 340 and a pixel series in the data area 115 of the coded information generated by the coding module 330, and passes the generated information image 100 to the combining module 360.

The combining module 360, which is connected to the image receiving module 310, the information image generating module 350, and the output module 370, combines the information image 100 generated by the information image generating module 350 with the image received by the image receiving module 310, and passes a resulting combined image to the output module 370. An example combined image is the document image 200 shown in FIG. 2. The combining subject area may be either the entire image or a partial area of the image. The combining subject area may either have a predetermined position and size or be determined by analyzing the image and determining a position and a size according to analysis results. For example, image analysis results are a position and a size of an area excluding black areas.

The output module 370, which is connected to the combining module 360, receives the combined image generated by the combining module 360 and outputs it. The term "to output an image" includes printing an image with a printing apparatus such as a printer, displaying an image on a display device, sending an image with an image transmitting apparatus such as a facsimile machine, writing an image to an image storage device such as an image database, storing an image in a storage medium such as a memory card, passing an image to another, information processing apparatus, etc.

FIG. 4 shows an example algorithm for generating third information (hereinafter referred to as a signal series X) and fourth information (hereinafter referred to as a signal series Y). This process is executed by the third series/fourth series generating module 344. It is assumed that a signal series X and a signal series Y to be generated have the same length which is N bits.

At step S400, "0" is substituted into variable dmin.

Step S402 serves to repeat steps S402-S434, and the repetition is controlled by "for ($X=2^{N-1}$; $X<2^N-1$; X++)." That is, $2^{N-1}$ is substituted into a signal series X. As long as ($X<2^N-1$)

is true, steps S404-S434 are executed and X is incremented by 1. Since the MSB (most significant bit) is also a bit of an All "1" signal, the MSB is equal to "1."

Step S404 serves to repeat steps S404-S432, and the repetition is controlled by "for ($Y=2^{N-1}$; $Y<2^N-1$; $Y++$)." That is, $2^{N-1}$ is substituted into a signal series Y. As long as ($Y<2^N-1$) is true, steps S406-S432 are executed and Y is incremented by 1. Since the MSB is also a bit of an All "1" signal, the MSB is equal to "1."

At step S406, a reverse signal series (i.e., a signal series obtained by reversing the order of the bits of the signal series X) of the signal series X is substituted into a signal series RX. That is, reserve information of the signal series X is generated by scanning the bits of the signal series X from the LSB (least significant bit) to the MSB.

At step S408, a reverse signal series (i.e., a signal series obtained by reversing the order of the bits of the signal series Y) of the signal series Y is substituted into a signal series RY. That is, reserve information of the signal series Y is generated by scanning the bits of the signal series Y from the LSB to the MSB.

At step S410, d(X, Y) is calculated, where d(X, Y) is a function of calculating a Huffman distance between X and Y. That is, a distance between the signal series X and the signal series Y in an information space is calculated.

At step S412, d(X, RX) is calculated. That is, a distance between the signal series X and the signal series RX in the information space is calculated.

At step S414, d(X, RY) is calculated. That is, a distance between the signal series X and the signal series RY in the information space is calculated.

At step S416, d(X, All "1") is calculated. That is, a distance between the signal series X and the signal series All "1" in the information space is calculated.

At step S418, d(Y, RX) is calculated. That is, a distance between the signal series Y and the signal series RX in the information space is calculated.

At step S420, d(Y, RY) is calculated. That is, a distance between the signal series Y and the signal series RY in the information space is calculated.

At step S422, d(Y, All "1") is calculated. That is, a distance between the signal series Y and the signal series All "1" in the information space is calculated.

At step S424, a minimum value d among the seven Huffman distances calculated at step S410-S422 is determined. This may be done by using a function for determining a minimum value.

At steps S426-S432, a set of a signal series X and a signal series Y whose minimum value d of the seven Huffman distances is largest among minimum values obtained by the repetitions controlled by steps S402 and S404.

At step S426, variable d is compared with variable dmin. That is, if (d>dmin) is true, steps S428 and S430 are executed.

At step S428, variable d is substituted into variable dmin.

At step S430, the current signal series X and signal series Y are stored in the sync series storage module 346. They are employed as candidates for pieces of information of the pixel series X 113 and the pixel series Y 114.

Since the pixel series X 113 and the pixel series Y 114 intersect each other (in the example of FIG. 1, the second row, second column position), the bits, corresponding to the intersecting point, of the signal series X and the signal series Y need to have the same information ("0" or "1"). Therefore, a judgment as to whether or not those bits have the same information may be added to step S426. More specifically, steps S428 and S430 may be executed in the case where (d>dmin) is true and those bits of the signal series X and the signal series Y have the same information.

Processing that does not calculate a minimum value d among the seven Huffman distances is possible. That is, each of the seven Huffman distances is compared with a predetermined threshold value, and the current signal series X and signal series Y are employed as candidates for pieces of information of the pixel series X 113 and the pixel series Y 114 if every Huffman distance is larger than or equal to the threshold value.

It is also possible to arrange minimum values of sets of seven Huffman distances in descending order and employ, as sets of candidates for pieces of information of the pixel series X 113 and the pixel series Y 114, sets of a signal series X and a signal series Y whose minimum values have ranks that are higher than or equal to a predetermined rank.

After determining a candidate signal series X and signal series Y, they are selected and made pieces of information of the pixel series X 113 and the pixel series Y 114. Where plural sets of candidates exist, any one of those sets may be selected.

The process of FIG. 4, which is executed by third series/fourth series generating module 344, may be executed before the image receiving module 310 receives an image or the information receiving module 320 receives information or every time the image receiving module 310 receives an image or the information receiving module 320 receives information.

FIG. 5 is a flowchart of an example process which is executed by the image processing apparatus for combining information images with an image.

At step S502, the image receiving module 310 receives a subject image.

At step S504, the information receiving module 320 receives information to be combined with the image.

At step S506, the coding module 330 codes the received information. This step will be described below with reference to FIG. 6.

FIG. 6 illustrates an example process for generating codewords. This process is executed by the coding module 330.

(1) CRC-16 parity bits of information to be buried which is information received by the information receiving module 320 are generated and added to the original information to be buried.

Referring to FIG. 6, at step S602, CRC-16:620 bits are calculated from original information 610 and added to the original information 610. The CRC (cyclic redundancy check) uses a cyclic code to detect an error in a lump of data. The original information 610 is part (16 bytes) of the information received by the information receiving module 320. The codeword generation process is executed in such a manner that the received information is divided into 16-byte data. If the information amount of the last divisional original information 610 or the information itself received by the information receiving module 320 is smaller than 16 bytes, the lacking portion of the last original information 610 or the received information itself is given predetermined information (e.g., a succession of "0"). It goes without saying that CRC-16 and 16 bytes are just examples and another parity check method and another byte length may be employed.

(2) The information generated by step (1) is coded using an error correcting code (e.g., BCH code). If coded information has such a long code length as not to be contained in the data area of one information image 100, information series obtained by dividing the information generated by step (1)

and adding, to resulting pieces of information, IDs (information identifiers) indicating their order are given error correcting codes.

Referring to FIG. 6, at step S604, the connection of the original information 610 and the CRC-16:620 bits is divided into eight pieces of information and 3-bit IDs are added to them, respectively. More specifically, as shown in FIG. 6, the connection of the original information 610 and the CRC-16: 620 bits is divided into eight pieces of 18-bit divisional information 631B-338B and 3-bit IDs 631A-638A representing "1" to "7" are added to them, respectively. That is, eight pieces of 21-bit ID-added divisional information 631-638 are generated. It goes without saying that the division number "8," the 18-bit length of each piece of divisional information, the 3-bit length of each ID are just examples, and another division number and other bit lengths may be employed.

At step S606, the ID-added divisional information 631-638 are coded by BCH (60, 21, t=7) code. The BCH (Bose-Chaudhuri-Hocquenghem) code is an error detecting and correcting code using a cyclic redundancy check code. In this manner, eight codewords 641-648 are generated as shown in FIG. 6. It goes without saying that the BCH coding is just an example and another coding method may be employed.

Returning to FIG. 5, at step S508, the information image generating module 350 generates an information image using the pixel series A 111, the pixel series B112, the pixel series X 113, the pixel series Y 114, and the pieces of coded information generated at step S506.

More specifically, the pixel series A 111, the pixel series B112, the pixel series X 113, the pixel series Y 114 are buried in the combining area (combining area 210 shown in FIG. 2) of the image. Then, the codewords generated at step S506 are buried in the data areas 115 of the respective information images 100A in the combining area 210 starting from the data area 115 of the top-left information image 100A. If the code length of a codeword is not equal to the size of the data area 115, a portion of the data area 115 is left over. For example, 0s may be buried in the left-over portion. If there remain, in the combining area 210, information images 100A whose data areas 115 are left unburied, the same codewords may be buried in those information images 100A. In this case, the combining area 210 has plural information images 100 containing the same buried information.

At step S510, the combining module 360 combines the information images with the image by OR combining, Exclusive-OR combining, or the like.

At step S512, the output module 370 outputs a combined image.

Figure 7:
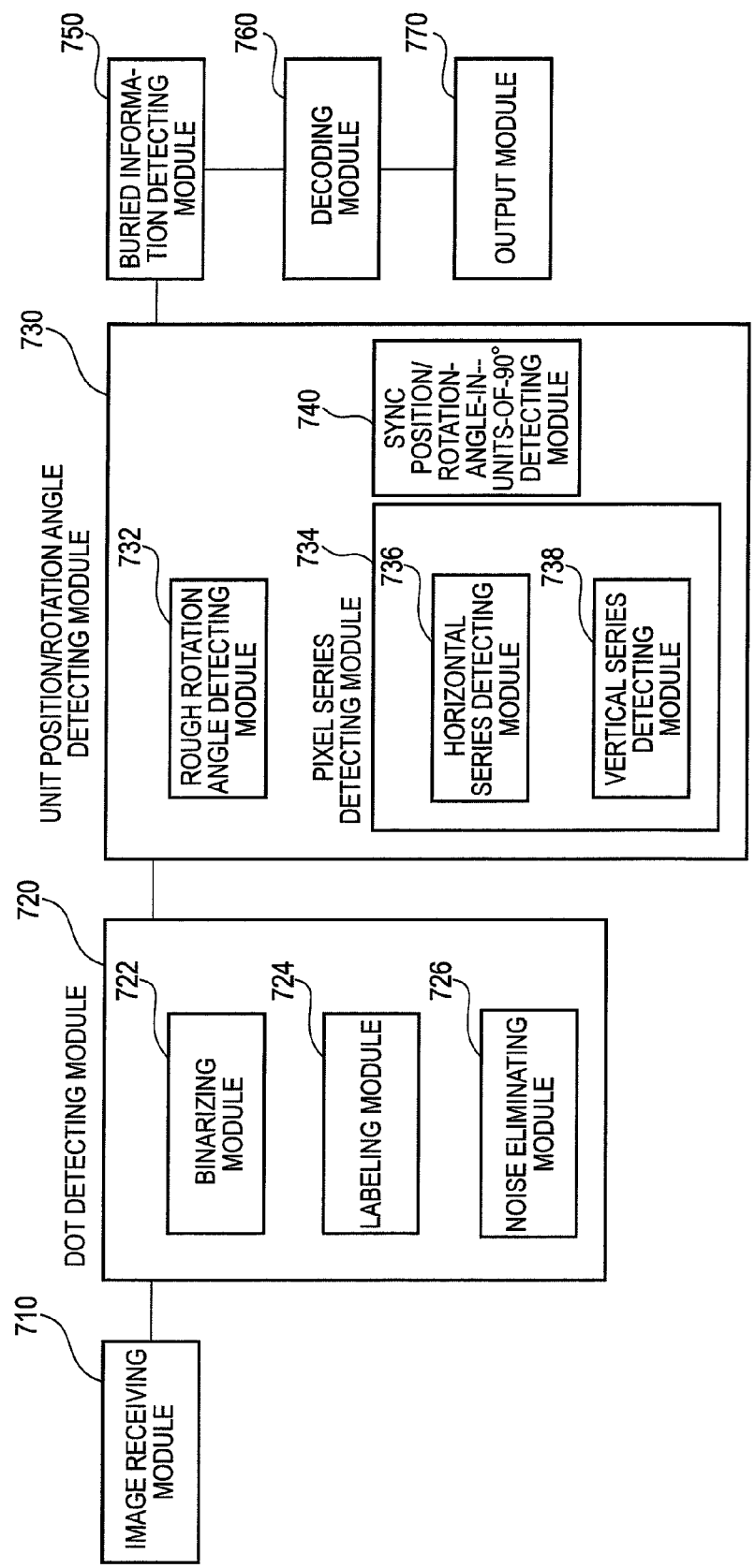
FIG. 7 is a conceptual diagram showing an example module configuration of an image processing apparatus according to the embodiment for detecting information images.

FIG. 7 is a conceptual diagram showing an example module configuration of an image processing apparatus according to the embodiment for detecting information images. As shown in FIG. 7, the image processing apparatus is composed of an image receiving module 710, a dot detecting module 720, a unit position/rotation angle detecting module 730, a buried information detecting module 750, a decoding module 760, and an output module 770.

In the following description, the row right under a detected row and the row right over the detected row are used as rows relating to the detected row, and the column immediately on the right of a detected column and the column immediately on the left of the detected column are used as columns relating to the detected column. And this is applicable to the case that the pixel series X 113 is located right under the pixel series A 111 and the pixel series Y 114 is located immediately on the right of the pixel series B 112. If the positional relationship between the pixel series A 111 and the pixel series X 113 and the positional relationship between pixel series B 112 and the pixel series Y 114 are not the above ones, the above-mentioned terms "the row right under a detected row and the row right over the detected row" and "the column immediately on the right of a detected column and the column immediately on the left of the detected column" should read "rows having predetermined relationships with a detected row and "columns having predetermined relationships with a detected row column."

The image receiving module 710, which is connected to the dot detecting module 720, receives a combined image (obtained by combining information images 100 with an image) and passes the received combined image to the dot detecting module 720. The term "to receive an image (combined image)" includes reading an image with a scanner or the like, receiving an image from an external apparatus over a communication line by facsimile or the like, taking video with a CCD (charge-coupled device) or the like, reading an image from an HDD (one incorporated in a computer, one connected via a network, or the like) or the like, etc. An image to be received may be either a binary image or a multi-value image (including a color image) as long as it is one obtained by combining information images 100 with an image. That is, an image to be received is a combined image that is output from the image processing apparatus of FIG. 3 and then, for example, read with a scanner or the like. A single image or plural images may be received. An image to be received may be a business document, a brochure for advertisement, or the like.

The dot detecting module 720, which is connected to the image receiving module 710 and the unit position/rotation angle detecting module 730, is equipped with a binarizing module 722, a labeling module 724, and a noise eliminating module 726.

The binarizing module 722, which is connected to the labeling module 724, binarizes the image received from the image receiving module 710 by, for example, floating binarization which is suitable for extraction of a black pixel lump which is darker than a surrounding portion. The binarizing module 722 passes a resulting binarized image to the labeling module 724.

The labeling module 724, which is connected to the binarizing module 722 and the noise eliminating module 726, performs labeling processing on the image binarized by the binarizing module 722. That is, the labeling module 724 attaches a unique label to a black pixel lump. The labeling module 724 calculates an area of the black pixel lump by counting the number of label-attached pixel lumps. The labeling module 724 passes the calculation result to the noise eliminating module 726.

The noise eliminating module 726, which is connected to the labeling module 724, performs noise elimination based on the result (i.e., the area of each black pixel lump) of the labeling processing of the labeling module 724. The noise elimination is performed by comparing the area of the black pixel lump with predetermined threshold values. For example, if the area of the black pixel lump is not within a predetermined range (defined by two predetermined threshold values), it may be regarded as noise. The noise elimination processing serves to eliminate areas that are too large or small as compared with buried black pixel lumps (dots). Black pixel lumps in an information image 100 can thus be detected.

The unit of processing of the dot detecting module 720 and the unit position/rotation angle detecting module 730 may be a rectangle whose sides are $\sqrt{2}$ or more times as long as the row or column length of each information image 100. The unit of processing will be described later with reference to FIG. 9.

The unit position/rotation angle detecting module 730, which is connected to the dot detecting module 720 and the buried information detecting module 750, is equipped with a rough rotation angle detecting module 732, a pixel series detecting module 734, and a sync position/rotation-angle-in-units-of-90° detecting module 740.

The rough rotation angle detecting module 732 detects a rough rotation angle of the image received by the image receiving module 710 using the black pixel lumps detected by the dot detecting module 720. The rough rotation angle detecting module 732 detects sets of adjoining black pixel lumps detected by the dot detecting module 720 and detects a rough rotation angle of the image based on the detected sets of adjoining black pixel lumps. For example, a direction, as viewed from a certain black pixel lump, of a neighboring black pixel lump on the right of (or on the left of, above, or below) the certain black pixel lump. Since a black pixel lump interval is known (determined in advance), plural sets of black pixel lumps that are located at positions that approximately satisfy the black pixel lump interval are collected and groups of sets of black pixel lumps that are in to the same direction are formed. A rotation angle can be calculated by taking an average in a group having a large number of sets of black pixel lumps. The calculated rotation angle is in a range of −45° to +45°. The term "positions that approximately satisfy the black pixel lump interval" means positions whose distance is in a range defined by distances obtained by adding and subtracting a predetermined value to and from the black pixel lump interval. The term "in the same direction" means that the angle of the line from a certain black pixel lump to a neighboring black pixel lump is within a predetermined range.

The pixel series detecting module 734 is equipped with a horizontal series detecting module 736 and a vertical detecting module 738. The pixel series detecting module 734 detects the pixel series A 111 and the pixel series B112 of an information image 100 in the image received by the image receiving module 710 based on the rough rotation angle that has been detected by the rough rotation angle detecting module 732 using the black pixel lumps detected by the dot detecting module 720. The term "based on the rough rotation angle" means based on a rotation angle that is in a range defined by angles obtained by adding and subtracting a predetermined value to and from the rough rotation angle detected by the rough rotation angle detecting module 732. That is, the pixel series detecting module 734 performs processing of detecting a pixel series A 111 and a pixel series B 112 based on a rotation angle within such a range. This processing is actually performed by one or both of the horizontal series detecting module 736 and the vertical detecting module 738.

Figures 10A, 10B:
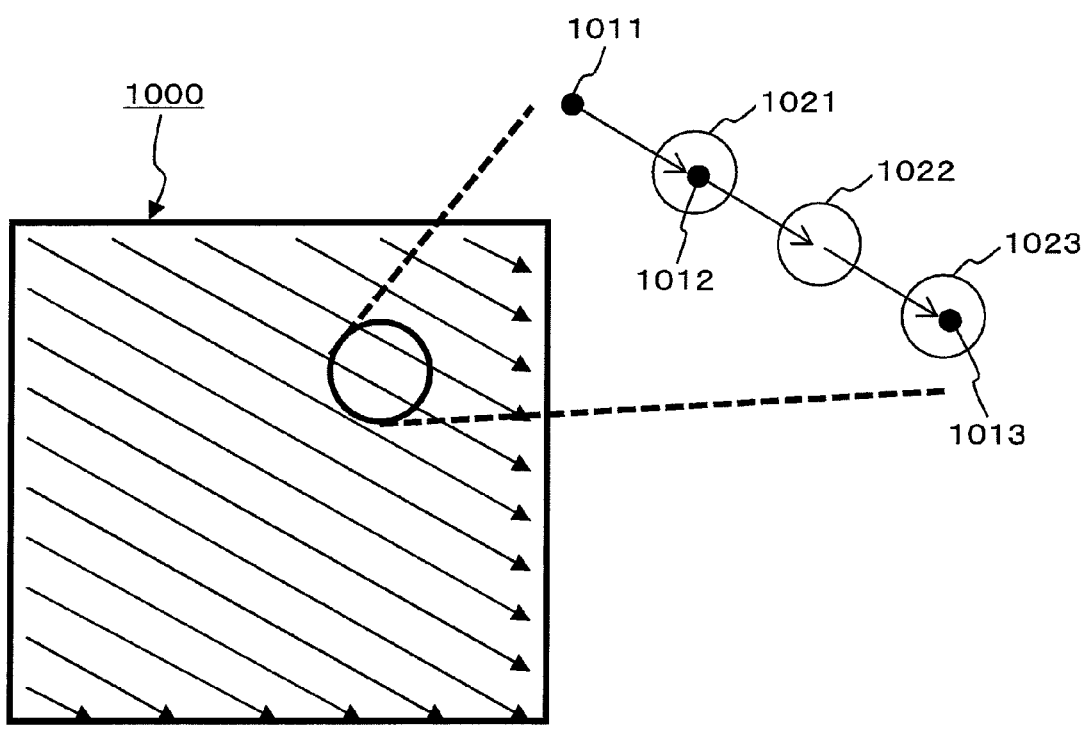
FIGS. 10A and 10B illustrate example pixel series search processing.

The horizontal series detecting module 736 detects a row in which black pixel lumps detected by the dot detecting module 720 exist at a high percentage in the right-adjacent direction or the left-adjacent direction. This means detection of a row in which black pixel lumps are arranged continuously (a pixel series A 111 or a pixel series B 112 in the case of 90° rotation). The term "a row in which black pixel lumps exist at a high percentage" means a row in which the percentage of black pixel lumps arranged continuously is higher than a predetermined threshold value or highest (in the case where plural rows are detected). The details of this processing will be described later with reference to FIG. 10.

The vertical series detecting module 738 performs, in the downward-adjacent direction or the upward-adjacent direction, processing that is equivalent to the processing performed by the horizontal series detecting module 736, that is, detects a column in which black pixel lumps exist at a high percentage, in the case where horizontal series detecting module 736 could not detect a row as mentioned above.

If the vertical series detecting module 738 could not detect such a column either, the dot detecting module 720 processes the next rectangular area (next unit of processing) and then the rough rotation angle detecting module 732 and the pixel series detecting module 734 operates again.

The sync position/rotation-angle-in-units-of-90° detecting module 740 detects a pixel series X 113 or a pixel series Y 114 based on the pixel series A 111 or the pixel series B 111 detected by the pixel series detecting module 734, and detects a rotation angle of the image and a sync position (for example, as mentioned above, a position where the first pixel series (pixel series A 111) and the second pixel series (pixel series B 112) intersect; more specifically, to-left coordinates, top-right coordinates, bottom-left coordinates, or bottom-right coordinates of the information image 100) which is a predetermined position of the information image 100 in the combining area 210. The details of this processing will be described later with reference to FIGS. 11-13.

The module 740 calculates an inclination of the row detected by the horizontal series detecting module 736 by linear regression or the like based on the positions of the black pixel lumps of that row. Then, the module 740 calculates a sync position and a rotation angle in units of 90° by comparing degrees of coincidence between signal series of the rows right under and over the detected row and the signal series in the X direction, Y direction, minus X direction, and minus Y direction. Then, the module 740 detects a rotation angle of the image based on the thus-calculated row inclination and rotation angle in units of 90°.

Or the module 740 calculates an inclination of the column detected by the vertical series detecting module 738 by linear regression or the like based on the positions of the black pixel lumps of that column. Then, the module 740 calculates a sync position and a rotation angle in units of 90° by comparing by comparing degrees of coincidence between signal series of the columns immediately on the right of and immediately on the left of the detected column and the signal series in the X direction, Y direction, minus X direction, and minus Y direction. Then, the module 740 detects a rotation angle of the image based on the thus-calculated column inclination and rotation angle in units of 90°.

The buried information detecting module 750, which is connected to the unit position/rotation angle detecting module 730 and the decoding module 760, detects a fifth pixel series in the data area 115 of each information image 100 that is combined with the image based on the sync position of the information image 100 and the rotation angle of the image detected by the sync position/rotation-angle-in-units-of-90° detecting module 740. More specifically, for example, this may be done in the following manner. The image is returned to a normally oriented state by rotating it by the detected rotation angle in the reverse direction, and a fifth pixel series in the data area 115 of each information image 100 that has the predetermined positional relationship with the sync position is detected. Alternatively, a fifth pixel series in the data area 115 of each information image 100 may be detected by determining reading positions and order based on the image received by the image receiving module 710.

The decoding module 760, which is connected to the buried information detecting module 750 and the output module 770, decodes the fifth pixel series detected by the buried information detecting module 750. That is, the decoding module 760 decodes the information coded by the coding module 330 shown in FIG. 3.

The output module 770, which is connected to the decoding module 760, outputs the information buried in the data areas of the information images 100 decoded by the decoding module 760. The term "to output information" includes printing information with a printing apparatus such as a printer, displaying information on a display device, writing information to an image storage device such as an image database, storing information in a storage medium such as a memory card, passing information to another, information processing apparatus, etc.

FIG. 8 is a flowchart of an example process which is executed by the image processing apparatus for detecting information images.

At step S802, the image receiving module 710 receives a combined image.

At step S804, the binarizing module 720 performs binarization processing.

At step S806, the labeling module 724 performs labeling processing. Steps S806-S818 are executed for each unit processing (mentioned above). If a sync position or a rotation angle in units of 90° is not detected in one unit of processing, steps S806-S818 are executed again for the next unit of processing.

Figure 9:
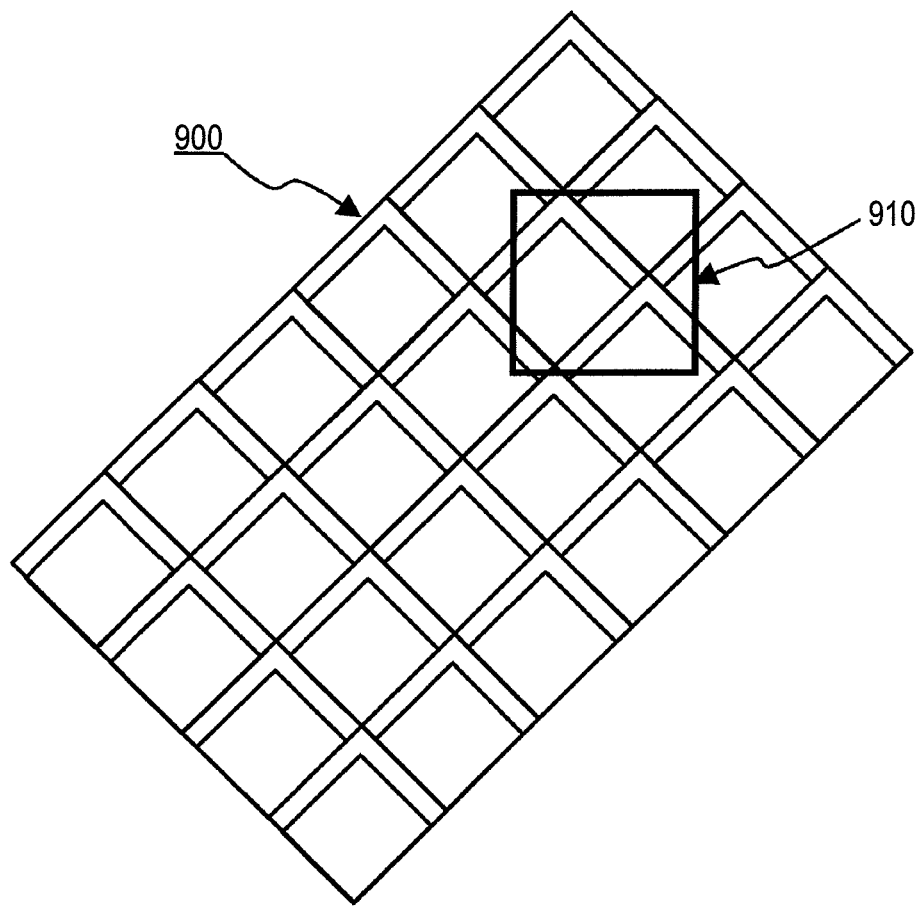
FIG. 9 illustrates an example unit of processing.

The unit of processing will be described below with reference to FIG. 9. FIG. 9 illustrates an example unit of processing. A combined image 900 is one generated by combining plural information images 100 with an image, and the information images 100 are arranged in the combined image 900. The combined image 900 is rotated because, for example, a document was inclined when it was read.

A unit of processing 910 shown in FIG. 9 is a rectangle whose sides are √2 times or more as long as the row or column length of each information image 100. That is, it suffices that the unit of processing 910 contain at least one cycle of each of the pixel series A 111, the pixel series B 112, the pixel series X 113, and the pixel series Y 114. Therefore, the processing of each of the dot detecting module 720 and the unit position/rotation angle detecting module 730 need not be performed on the entire scanned image. The next unit of processing may be a unit of processing obtained by shifting the preceding unit of processing 910 by one pixel lump or more (e.g., its length in the row direction) rightward, for example. If the preceding unit of processing 910 cannot be shifted rightward, the next unit of processing may be obtained by shifting the preceding unit of processing 910 by one pixel lump or more (e.g., its length in the column direction) downward, for example, and then moving a resulting area to the left end.

At step S808, the noise eliminating module 726 performs noise elimination.

At step S810, the rough rotation angle detecting module 732 detects a rough rotation angle.

At step S812, the horizontal series detecting module 736 detects a horizontal pixel series A (pixel series A 111 or pixel series B 112). This processing will be described with reference to FIGS. 10A and 10B, which illustrate example pixel series search processing. It is judged whether or not a black pixel lump exists in a search range 1021 that is adjacent, on the right, to a dot 1011 shown in FIG. 10B in a processing unit 1000 shown in FIG. 10A. The search range 1021 is a region that is determined using the rough rotation angle detected by the rough rotation angle detecting module 732. That is, it is judged whether or not a black pixel lump exists in a circle whose center is determined by the rough rotation angle and the black pixel lump interval in the information image 100 and whose radius is predetermined. This processing is performed repeatedly. A percentage at which a black pixel lump exists in each search range is calculated and a row is detected.

At step S814, it is judged whether or not the horizontal series detecting module 736 has detected a pixel series A. The process moves to step S818 if a pixel series A has been detected. If not, the process moves to step S816.

At step S816, the vertical series detecting module 728 detects a vertical pixel series B (pixel series A 111 or pixel series B 112). Step S816 is equivalent to a 90°-rotated version of step S812.

At step S818, the sync position/rotation-angle-in-units-of-90° detecting module 740 detects a sync position and a rotation angle in units of 90° based on degrees of coincidence between pieces of information represented by pixel series having predetermined positional relationships with the pixel series A or B and the pieces of information of the signal series X, Y, RX, and RY.

Figure 11:
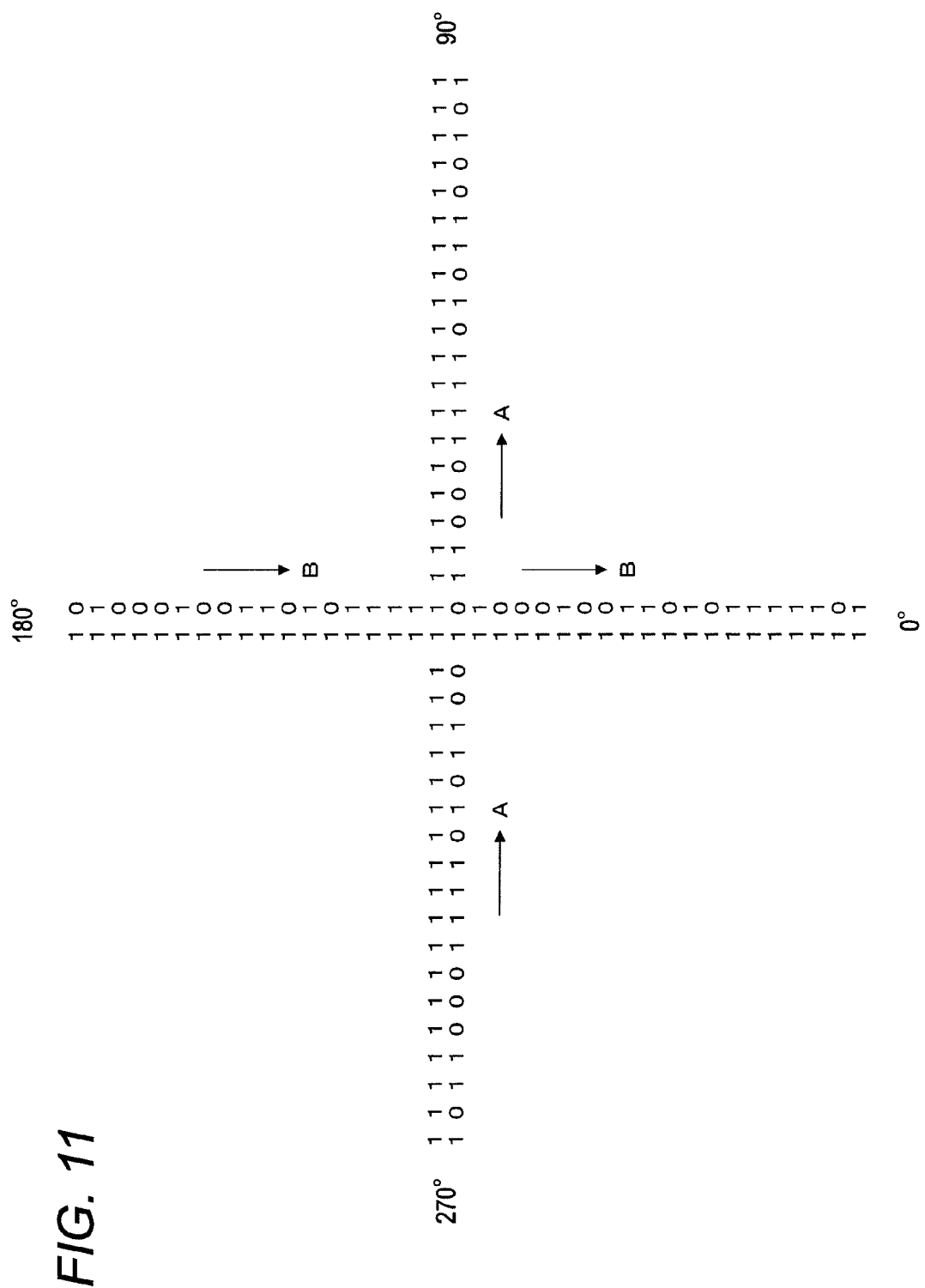
FIG. 11 illustrates how a rotation angle in units of 90° is detected.

Step S818 will be described below with reference to FIG. 11. If a pixel series X 113 exists right under the horizontal pixel series A (or All "1" signal series), the rotation angle in units of 90° of the image is 0°. If a reversed version of a pixel series Y 114 exists right under the horizontal pixel series A the rotation angle in units of 90° of the image is 90°. If a reversed version of a pixel series X 113 exists right over the horizontal pixel series A the rotation angle in units of 90° of the image is 180°. If a pixel series Y 114 exists right over the horizontal pixel series A the rotation angle in units of 90° of the image is 270°. In FIG. 11, arrows A indicate the positive direction of a pixel series X 113 and arrows B indicate the positive direction of a pixel series Y 114.

Figures 12, 13A, 13B, 14:
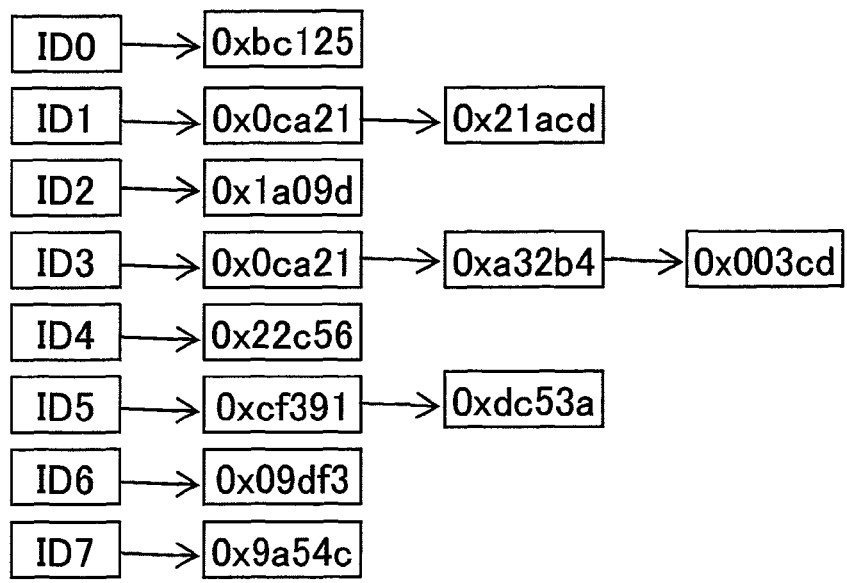
FIG. 12 shows an example set of detected signal series.
FIGS. 13A and 13B show how the bits of a signal series are shifted.
FIG. 14 illustrates example decoding processing.

Next, a description will be made with reference to FIG. 12 and FIGS. 13A and 13B. FIG. 12 shows an example set of detected signal series. FIGS. 13A and 13B show how the bits of a signal series are shifted.

A description will be made for an example in which the size (N×N) of the information image 100 is 18×18, the signal series X="101100011110101100," and the signal series Y="101000100110101111."

If the image received by the image receiving module 710 is not rotated and a row that has been detected by the pixel series detecting module 734 and has a large number of 1s (i.e., a succession of pixel series A 111 or pixel series B 112) and a row right under the former are as shown in FIG. 12, the latter row should be more than one cycle of the signal series X.

In this case, the 18-bit information starting from the left end of the row right under the row having a large number of 1s is correlated with signal series obtained by shifting the bits of the signal series X (see FIG. 13A) by one bit at a time. A signal series (see FIG. 13B) obtained by a 5-bit shift exhibits a highest correlation. Therefore, it can be inferred that the sync position (the top-left corner of the information image 100, the head position of the pixel series A 111) is the (18−5+1)th bit from the left end. That is, a sync position can be calculated according to a formula "N−(the number of bits of a shift that produces a highest correlation)+1."

The above description is directed to the case that the image received by the image receiving module 710 is not rotated. However, actually, it is unknown by what angle (an angle from 0° to 360°) the image is rotated. Therefore, the following processing is performed:

(1) Correlations between the row right under the row having a large number of 1s and shifted versions of the signal series X;

(2) correlations between the row right under the row having a large number of 1s and shifted versions of the signal series RY;

(3) correlations between the row right over the row having a large number of 1s and shifted versions of the signal series RX; and (4) correlations between the row right over the row having a large number of 1s and shifted versions of the signal series Y are calculated.

If a maximum correlation is obtained in item (1), it is judged that there is no rotation. If a maximum correlation is obtained in item (2), it is judged that the image is rotated clockwise by 90°. If a maximum correlation is obtained in item (3), it is judged that the image is rotated clockwise by 180°. If a maximum correlation is obtained in item (4), it is judged that the image is rotated clockwise by 270°.

A rotation angle of the image is determined by adding, to the thus-determined rotation angle, the angle (−45° to +45°) of the arrangement direction of the black pixel lumps of the row having a large number of 1s. As described above, a start position (sync position) of the sync signal is determined based on the shift amount that produces the maximum correlation value.

If the horizontal series detecting module 736 cannot detect a row (e.g., the percentage of 1s in a row having a large number of 1s is smaller than a predetermined threshold value) or a maximum correlation value is smaller than a predetermined threshold value, the probability of erroneous detection is high. Therefore, in this case, the vertical series detecting module 738 detects a column having a large number of 1s and calculates correlations between the rows on the left of and on the right of the detected column and shifted versions of the signal series X, Y, RX, and RY. That is, (1) correlations between the column immediately on the right of the column having a large number of 1s and shifted versions of the signal series Y;

(2) correlations between the column immediately on the left of the column having a large number of 1s and shifted versions of the signal series X;

(3) correlations between the column immediately on the left of the column having a large number of 1s and shifted versions of the signal series RY; and (4) correlations between the column immediately on the right of the column having a large number of 1s and shifted versions of the signal series RX are calculated.

If a maximum correlation is obtained in item (1), it is judged that there is no rotation. If a maximum correlation is obtained in item (2), it is judged that the image is rotated clockwise by 90°. If a maximum correlation is obtained in item (3), it is judged that the image is rotated clockwise by 180°. If a maximum correlation is obtained in item (4), it is judged that the image is rotated clockwise by 270°.

A rotation angle of the image is determined by adding, to the thus-determined rotation angle, the angle (−45° to +45°) of the arrangement direction of the black pixel lumps of the column having a large number of 1s. As described above, a start position (sync position) of the sync signal is determined based on the shift amount that produces the maximum correlation value.

At step S820, the buried information detecting module 750 detects buried information based on the fifth information contained in the data areas 115 of the information images 100 using the image rotation angle and the sync position.

At step S822, the decoding module 760 performs decoding processing with error correction. This processing will be described with reference to FIG. 14. FIG. 14 illustrates example decoding processing. The detected signal is subjected to error correction decoding and decoded data is converted into list data having respective IDs without duplication. Avoiding duplication is to accommodate a case that information is buried in the data areas 115 repeatedly. In the example of FIG. 14, there are two codewords having an ID "1," three codewords having an ID "3," and two codewords having an ID "5" and one codeword exists for each of the other IDs. Therefore, there are 12 (2×3×2) combinations. These combinations (of codewords having the IDs "1" to "7") are subjected to CRC. Each of these combinations corresponds to the connection of the original information 610 and the CRC-16:620 bits (see FIG. 6). Legitimate data obtained by the CRC is employed as decoded information. If legitimate data is found among the 12 combinations halfway in the CRC process, the remaining combinations need not be processed. Where the coding module 330 performed coding processing other than the CRC-16/BCH coding, the decoding module 760 performs decoding processing suitable for the coding processing.

At step S824, the output module 770 outputs the decoded information.

Figure 15:
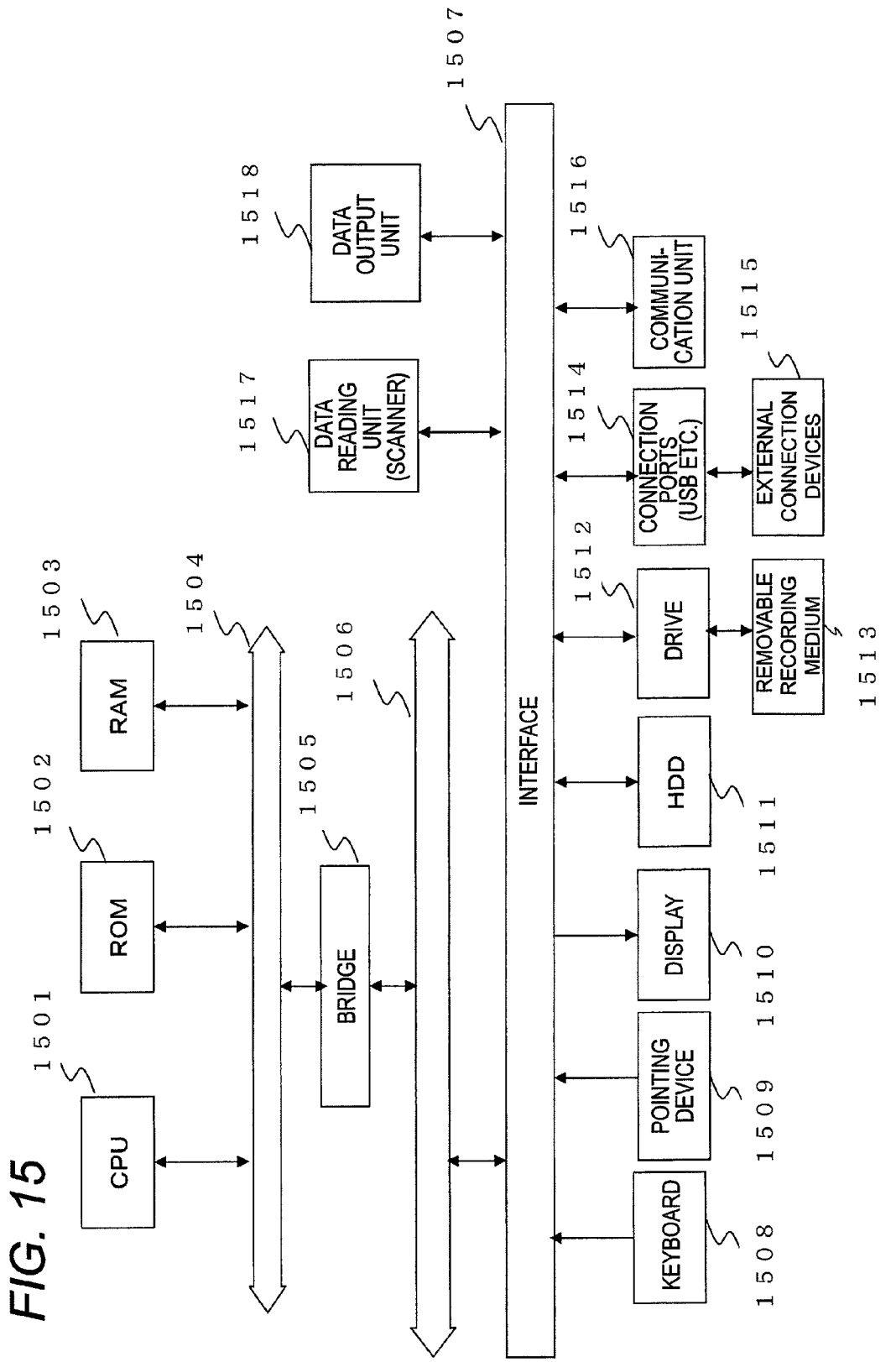
FIG. 15 is a block diagram showing a hardware configuration of a computer as an implementation of the embodiment.

An example hardware configuration of the image processing apparatus according to the embodiment will be described below with reference to FIG. 15. FIG. 15 shows an example hardware configuration which is mainly of a personal computer (PC) or the like and is also includes a data reading unit 1517 such as a scanner and a data output unit 1518 such as a printer.

A CPU (central processing unit) 1501 is a control section which operates according to a computer program including execution sequences of the various modules described above such as the coding module 330, the information image generating module 350, the first series/second series generating module 342, the third series/fourth series generating module 344, the combining module 360, the dot detecting module 720, the unit position/rotation angle detecting module 730, the buried information detecting module 750, and the decoding module 760.

A ROM (read-only memory) 1502 is stored with programs, operation parameters, etc. to be used by the CPU 1501. A RAM (random access memory) 1503 stores programs to be run by the CPU 1501, parameters whose values vary as those programs are run, and other information. The CPU 1501, the ROM 1502, and the RAM 1503 are connected to each other by a host bus 1504 such as a CPU bus.

The host bus 1504 is connected to an external bus 1506 such as a PCI (peripheral component interconnect/interface) bus via a bridge 1505.

A keyboard 1508 and a pointing device 1509 such as a mouse are input devices which are operated by an operator. A display 1510, which is a liquid crystal display device, a CRT (cathode-ray tube) display, or the like, displays various kinds of information in the form of a text or image information.

An HDD (hard disk drive) 1511 drives incorporated hard disks and stores and reproduces programs and information to be run or used by the CPU 1501. A received image, received information, sync series, detected information, etc. are stored in the HDD 1511. Other various computer programs such as various data processing programs are stored in the HDD 1511.

A drive 1512 reads out data or a program stored in an inserted removable recording medium 1513 such as a magnetic disk, an optical disc, a magneto-optical disc, or a semiconductor memory and supplies the read-out data or program to the RAM 1503 via an interface 1507, the external bus 1506, the bridge 1505, and the host bus 1504. The removable recording medium 1513 can also be used as a data storage area like the one provided by the HDD 1511.

Connection ports 1514 are ports such as a USB port and an IEEE 1394 port to which external connection devices 1515 are to be connected. The connection ports 1514 are connected to the CPU 1501 etc. via the interface 1507 and the external bus 1506, the bridge 1505, the host bus 1504, etc. A communication unit 1516 is connected to a network and performs processing for a data communication with the outside. The data reading unit 1517, which is a scanner or the like, performs document reading processing. The data output unit 1518, which is a printer or the like, performs document data output processing.

The hardware configuration of the image processing apparatus shown in FIG. 15 is just an example, and the embodiment can be implemented by configurations other than the configuration of FIG. 15 as long as they enable operation of the modules described in the embodiment. For example, part of the modules may be implemented as dedicated hardware such as an ASIC (application-specific integrated circuit). Part of the modules may be provided in an external system which is connected via a communication line. Plural systems as shown in FIG. 15 may be connected to each other via communication lines so as to cooperate with each other. Furthermore, the image processing apparatus according to the embodiment may be incorporated in a copier, a facsimile machine, a scanner, a printer, a multifunction machine (i.e., an image processing apparatus having two or more of the copier, facsimile machine, scanner, printer functions), or the like.

Although in the embodiment, the example configuration of the image processing apparatus for combining information images with an image (see FIG. 3) and the example configuration of the image processing apparatus for detecting information images (see FIG. 7) are described separately, they may be combined together. That is, a single image processing apparatus may combine information images with an image and detect the information images from a combined image. In this case, the image receiving module 710 shown in FIG. 7 receives an image that is output from the output module 370 shown in FIG. 3.

The dot detecting module 720 of the image processing apparatus of FIG. 7 may be omitted. In this case, the rough rotation angle detecting module 732 and the pixel series detecting module 734 of the unit position/rotation angle detecting module 730 may detect black pixel lumps.

The rough rotation angle detecting module 732 of the image processing apparatus of FIG. 7 may be omitted. In this case, the horizontal series detecting module 732 or the vertical series detecting module 738 detects a pixel series A 111, a pixel series B 112, a pixel series X 113, and a pixel series Y 114 without using a rough rotation angle detected by the rough rotation angle detecting module 732.

The terms "larger than or equal to," "smaller than or equal to," "larger than," and "smaller than" which are used in the embodiment in making a comparison with a predetermined value may be replaced by "larger than," "smaller than," "larger than or equal to," and "smaller than or equal to," respectively, as long as no contradiction occurs.

A technique described in the Background Art section may be added to the embodiment or employed in place of a module used in the embodiment.

The above-described program may be either provided in such a manner as to be stored in a storage medium or provided via a communication means. In such a case, for example, the aspect of the invention relating to the above-described program may be recognized as a computer-readable storage medium stored with the program. The term "computer-readable storage medium stored with the program" means one that is used for program installation, execution, distribution, etc.

The storage medium includes DVDs (digital versatile discs) that comply with the standards DVD-R, DVD-RW, DVD-RAM etc. which were worked out by the DVD Forum or the standards DVD+R, DVD+RW, etc. which were worked out by the DVD+RW Alliance, CDs (compact discs) such as a CD-ROM (read-only memory), a CD-R (recordable), and a CD-RW (rewritable), a Blu-ray disc (registered trademark), an MO (magneto-optical disc), an FD (flexible disk), a magnetic tape, an HDD (hard disk drive), a ROM (read-only memory), an EEPROM (electrically erasable programmable read-only memory), a flash memory, a RAM (random access memory), etc.

The above-described program or part of it may be, for example, put in storage or distributed being stored in any of the above storage media. The program or part of it may be transmitted over a transmission medium such as a wired network, a wireless communication network, or their combination used for a LAN (local area network), a MAN (metropolitan area network), a WAN (wide area network), the Internet, an intranet, an extranet, or the like, or transmitted being carried by a carrier wave.

The above-described program may be part of another program and may be stored in a storage medium together with a separate program. The program may be stored in a divisional manner in different storage media. Furthermore, the program may be stored in any form such as a compressed form or a coded form as long as it can be restored.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium having stored thereon an information image which has a rectangle shape, the information image comprising:
    a first pixel series that represents first information as a succession of binary numbers 0 or 1 and that is a series of pixel lumps arranged continuously as a row in the rectangle;
    a second pixel series that represents second information as a succession of binary numbers 0 or 1 and that is a series of pixel lumps arranged continuously as a column in the rectangle;
    a third pixel series that represents third information and that is a series of pixel lumps arranged continuously as a row which is located at a predetermined position with respect to the row of the first pixel series in the rectangle;
    a fourth pixel series that represents fourth information and that is a series of pixel lumps arranged continuously as a column which is located at a predetermined position with respect to the column of the second pixel series in the rectangle; and
    a fifth pixel series that represents fifth information buried in the information image and that is a series of pixel lumps arranged in an area other than the rows and the columns of the first pixel series, the second pixel series, the third pixel series, and the fourth pixel series in the rectangle, wherein
    the third information and the fourth information are determined from a plurality of third information candidate signal series and a plurality of fourth information candidate signal series, based on a determination, for each third information candidate signal series of the plurality of third information candidate signal series and each fourth information candidate signal series of the plurality of fourth information candidate signal series, (i) a distance between the third information candidate signal series and the fourth information candidate signal series in an information space, (ii) a distance between the third information candidate signal series and reversed information of the third information candidate signal series in the information space, (iii) a distance between the third information candidate signal series and reversed information of the fourth information candidate signal series in the information space, (iv) a distance between the third information candidate signal series and information which is a succession of binary numbers 0 or 1 in the information space, (v) a distance between the fourth information candidate signal series and reversed information of the fourth information candidate signal series in the information space, (vi) a distance between the fourth information candidate signal series and reversed information of the third information candidate signal series in the information space, and (vii) a distance between the fourth information candidate signal series and information which is a succession of binary numbers 0 or 1 in the information space.

2. An image processing apparatus comprising:
a first image receiving unit that receives an image;
an information receiving unit that receives information to be added to the image received by the first image receiving unit;
a coding unit that codes the information received by the information receiving unit;
a generating unit that generates an information image which has a rectangle shape based on:
  a first pixel series that represents first information as a succession of binary numbers 0 or 1 and that is a series of pixel lumps arranged continuously as a row in the rectangle,
  a second pixel series that represents second information as a succession of binary numbers 0 or 1 and that is a series of pixel lumps arranged continuously as a column in the rectangle,
  a third pixel series that represents third information and that is a series of pixel lumps arranged continuously as a row which is located at a predetermined position with respect to the row of the first pixel series in the rectangle,
  a fourth pixel series that represents fourth information and that is a series of pixel lumps arranged continuously as a column which is located at a predetermined position with respect to the column of the second pixel series in the rectangle, and
  a fifth pixel series that represents fifth information buried in the information image, that is a series of pixel lumps arranged in an area other than the rows and the columns of the first pixel series, the second pixel series, the third pixel series and the fourth pixel series in the rectangle, and that is based on coded information coded by the coding unit;
a combining unit that combines the information image generated by the generating unit with the image received by the first image receiving unit; and
an image output unit that outputs a combined image combined by the combining unit,
wherein the generating unit generates the third information and the fourth information based on a plurality of third information candidate signal series and a plurality of fourth information candidate signal series, based on a determination, for each third information candidate signal series of the plurality of third information candidate signal series and each fourth information candidate signal series of the plurality of fourth information candidate signal series, (i) a distance between the third information candidate signal series and the fourth information candidate signal series in an information space, (ii) a distance between the third information candidate signal series and reversed information of the third information candidate signal series in the information space, (iii) a distance between the third information candidate signal series and reversed information of the fourth information candidate signal series in the information space, (iv) a distance between the third information candidate signal series and information which is a succession of binary numbers 0 or 1 in the information space, (v) a distance between the fourth information candidate signal series and reversed information of the fourth information candidate signal series in the information space, (vi) a distance between the fourth information candidate signal series and reversed information of the third information candidate signal series in the information space, and (vii) a distance between the fourth information candidate signal series and information which is a succession of binary numbers 0 or 1 in the information space.

3. The image processing apparatus according to claim 2, further comprising:
a second image receiving unit that receives the combined image which is output by the image output unit;
a pixel series detecting unit that detects the first pixel series or the second pixel series of the information image in the combined image received by the second image receiving unit;
a sync position/rotation angle detecting unit that detects the third pixel series or the fourth pixel series using the first pixel series or the second pixel series detected by the pixel series detecting unit, and that detects a sync position and a rotation angle of the image which are predetermined positions in the information image respectively;
a detecting unit that detects the fifth pixel series of the information image using the sync position of the information image and the rotation angle of the image detected by the sync position/rotation angle detecting unit;
a decoding unit that decodes the fifth pixel series detected by the detecting unit; and
an output unit that outputs the fifth pixel series decoded by the decoding unit as information buried in the information image.

4. An image processing apparatus comprising:
a receiving unit that receives a combined image which contains an information image which has a rectangle shape, the information image comprising:
  a first pixel series that represents first information as a succession of binary numbers 0 or 1 and that is a series of pixel lumps arranged continuously as a row in the rectangle;
  a second pixel series that represents second information as a succession of binary numbers 0 or 1 and that is a series of pixel lumps arranged continuously as a column in the rectangle;
  a third pixel series that represents third information and that is a series of pixel lumps arranged continuously as a row which is located at a predetermined position with respect to the row of the first pixel series in the rectangle;

a fourth pixel series that represents fourth information and that is a series of pixel lumps arranged continuously as a column which is located at a predetermined position with respect to the column of the second pixel series in the rectangle; and a fifth pixel series that represents fifth information buried in the information image and that is a series of pixel lumps arranged in an area other than the rows and the columns of the first pixel series, the second pixel series, the third pixel series, and the fourth pixel series in the rectangle;

a pixel series detecting unit that detects the first pixel series or the second pixel series of the information image in the combined image received by the receiving unit;

a sync position/rotation angle detecting unit that detects the third pixel series or the fourth pixel series using the first pixel series or the second pixel series detected by the pixel series detecting unit, and that detects a sync position and a rotation angle of the image which are predetermined positions in the information image respectively using the detected third pixel series or the detected fourth pixel series;

a detecting unit that detects the fifth pixel series of the information image using the sync position of the information image and the rotation angle of the image detected by the sync position/rotation angle detecting unit;

a decoding unit that decodes the fifth pixel series detected by the detecting unit; and an output unit that outputs the fifth pixel series decoded by the decoding unit as information buried in the information image, wherein the third information and the fourth information are determined from a plurality of third information candidate signal series and a plurality of fourth information candidate signal series, based on a determination, for each third information candidate signal series of the plurality of third information candidate signal series and each fourth information candidate signal series of the plurality of fourth information candidate signal series, (i) a distance between the third information candidate signal series and the fourth information candidate signal series in an information space, (ii) a distance between the third information candidate signal series and reversed information of the third information candidate signal series in the information space, (iii) a distance between the third information candidate signal series and reversed information of the fourth information candidate signal series in the information space, (iv) a distance between the third information candidate signal series and information which is a succession of binary numbers 0 or 1 in the information space, (v) a distance between the fourth information candidate signal series and reversed information of the fourth information candidate signal series in the information space, (vi) a distance between the fourth information candidate signal series and reversed information of the third information candidate signal series in the information space, and (vii) a distance between the fourth information candidate signal series and information which is a succession of binary numbers 0 or 1 in the information space.

5. The image processing apparatus according to claim 4, further comprising a rotation angle detecting unit that detects sets of adjoining pixel lumps in the combined image received by the receiving unit, and that detects a rotation angle of the image based on the detected sets of adjoining pixel lumps, wherein the pixel series detecting unit detects the first pixel series or the second pixel series using the rotation angle detected by the rotation angle detecting unit.

6. A non-transitory computer-readable medium storing a program that causes a computer to execute image processing, the image processing comprising:

first receiving an image;

receiving information to be added to the first received image;

coding the received information;

generating an information image which has a rectangle shape based on:

a first pixel series that represents first information as a succession of binary numbers 0 or 1 and that is a series of pixel lumps arranged continuously as a row in the rectangle, a second pixel series that represents second information as a succession of binary numbers 0 or 1 and that is a series of pixel lumps arranged continuously as a column in the rectangle, a third pixel series that represents third information and that is a series of pixel lumps arranged continuously as a row which is located at a predetermined position with respect to the row of the first pixel series in the rectangle, a fourth pixel series that represents fourth information and that is a series of pixel lumps arranged continuously as a column which is located at a predetermined position with respect to the column of the second pixel series in the rectangle, and a fifth pixel series that represents fifth information buried in the information image, that is a series of pixel lumps arranged in an area other than the rows and the columns of the first pixel series, the second pixel series, the third pixel series, and the fourth pixel series in the rectangle, and that is based on the coded information coded by the coding step;

combining the generated information image with the first received image; and image outputting the combined generated image, wherein the third information and the fourth information are determined from a plurality of third information candidate signal series and a plurality of fourth information candidate signal series, based on a determination, for each third information candidate signal series of the plurality of third information candidate signal series and each fourth information candidate signal series of the plurality of fourth information candidate signal series, (i) a distance between the third information candidate signal series and the fourth information candidate signal series in an information space, (ii) a distance between the third information candidate signal series and reversed information of the third information candidate signal series in the information space, (iii) a distance between the third information candidate signal series and reversed information of the fourth information candidate signal series in the information space, (iv) a distance between the third information candidate signal series and information which is a succession of binary numbers 0 or 1 in the information space, (v) a distance between the fourth information candidate signal series and reversed information of the fourth information candidate signal series in the information space, (vi) a distance between the fourth information candidate signal series and reversed information of the third information candidate signal series in the information space, and (vii) a distance between the fourth information candidate signal series information which is a succession of binary numbers 0 or 1 in the information space.

7. The non-transitory computer-readable medium according to claim 6, the image processing further comprising:
second receiving the combined image which is output by the image output step;
detecting the first pixel series or the second pixel series of the information image in the second received image;
detecting the third pixel series or the fourth pixel series using the detected first pixel series or the detected second pixel series;
detecting a sync position and a rotation angle of the image which are predetermined positions in the information image respectively;
detecting the fifth pixel series of the information image using the detected sync position of the information image and the detected rotation angle of the image;
decoding the detected fifth pixel series; and
outputting the decoded fifth pixel series as information buried in the information image.

8. A non-transitory computer-readable medium storing a program that causes a computer to execute image processing, the image processing comprising:
receiving a combined image which contains an information image which has a rectangle shape, the information image comprising:
a first pixel series that represents first information as a succession of binary numbers 0 or 1 and that is a series of pixel lumps arranged continuously as a row in the rectangle;
a second pixel series that represents second information as a succession of binary numbers 0 or 1 and that is a series of pixel lumps arranged continuously as a column in the rectangle;
a third pixel series that represents third information and that is a series of pixel lumps arranged continuously as a row which is located at a predetermined position with respect to the row of the first pixel series in the rectangle;
a fourth pixel series that represents fourth information and that is a series of pixel lumps arranged continuously as a column which is located at a predetermined position with respect to the column of the second pixel series in the rectangle; and
a fifth pixel series that represents fifth information buried in the information image and that is a series of pixel lumps arranged in an area other than the rows and the columns of the first pixel series, the second pixel series, the third pixel series, and the fourth pixel series in the rectangle;
detecting the first pixel series or the second pixel series of the information image in the received image;
detecting the third pixel series or the fourth pixel series using the detected first pixel series or the detected second pixel series;
detecting a sync position and a rotation angle of the image which are predetermined positions in the information image respectively using the detected third pixel series or the detected fourth pixel series;
detecting the fifth pixel series of the information image using the detected sync position of the information image and the detected rotation angle of the image;
decoding the detected fifth pixel series; and
outputting information buried in the decoded information image,
wherein the third information and the fourth information are determined from a plurality of third information candidate signal series and a plurality of fourth information candidate signal series, based on a determination, for each third information candidate signal series of the plurality of third information candidate signal series and each fourth information candidate signal series of the plurality of fourth information candidate signal series, (i) a distance between the third information candidate signal series and the fourth information candidate signal series in an information space, (ii) a distance between the third information candidate signal series and reversed information of the third information candidate signal series in the information space, (iii) a distance between the third information candidate signal series and reversed information of the fourth information candidate signal series in the information space, (iv) a distance between the third information candidate signal series and information which is a succession of binary numbers 0 or 1 in the information space, (v) a distance between the fourth information candidate signal series and reversed information of the fourth information candidate signal series in the information space, (vi) a distance between the fourth information candidate signal series and reversed information of the third information candidate signal series in the information space, and (vii) a distance between the information candidate signal series and information which is a succession of binary numbers 0 or 1 in the information space.

* * * * *